United States Patent
Karalekas et al.

(10) Patent No.: US 12,112,234 B2
(45) Date of Patent: Oct. 8, 2024

(54) LOW-LATENCY, HIGH-PERFORMANCE HYBRID COMPUTING

(71) Applicant: Rigetti & Co, LLC, Berkeley, CA (US)

(72) Inventors: Peter Jonathan Karalekas, Berkeley, CA (US); Robert Stanley Smith, Emeryville, CA (US); Eric Christopher Peterson, Miami, FL (US); Nikolas Anton Tezak, Oakland, CA (US); Adam David Lynch, Alameda, CA (US); Christopher Butler Osborn, Oakland, CA (US); Steven Heidel, Oakland, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 647 days.

(21) Appl. No.: 17/184,702

(22) Filed: Feb. 25, 2021

(65) Prior Publication Data

US 2021/0357797 A1    Nov. 18, 2021

Related U.S. Application Data

(63) Continuation of application No. PCT/US2019/049090, filed on Aug. 30, 2019.
(Continued)

(51) Int. Cl.
*G06N 10/00* (2022.01)
*G06F 8/36* (2018.01)
(Continued)

(52) U.S. Cl.
CPC ............ *G06N 10/00* (2019.01); *G06F 8/36* (2013.01); *G06F 9/45558* (2013.01); *H04L 67/06* (2013.01); *G06F 2009/45595* (2013.01)

(58) Field of Classification Search
CPC ..................................... G06N 10/00
(Continued)

(56) References Cited

U.S. PATENT DOCUMENTS

| | | |
|---|---|---|
| 9,288,128 B1 | 3/2016 | Palacios et al. |
| 9,537,953 B1 | 1/2017 | Dadashikelayeh et al. |

(Continued)

FOREIGN PATENT DOCUMENTS

| | | |
|---|---|---|
| WO | 2014210368 | 12/2014 |
| WO | 2020047426 A1 | 3/2020 |
| WO | 2020168158 A1 | 8/2020 |

OTHER PUBLICATIONS

USPTO, Non-Final Office Action mailed Jun. 24, 2022, in U.S. Appl. No. 17/172,673, 40 pgs.
(Continued)

*Primary Examiner* — Eric D Lee
(74) *Attorney, Agent, or Firm* — Henry Patent Law Firm PLLC

(57) ABSTRACT

In a general aspect, a computer system includes a low-latency communication link between a classical computer and a quantum computing resource. In some cases, a quantum machine image operates on a classical computer system. The quantum machine image includes a virtualized execution environment for quantum programs. The quantum machine image is engaged with a quantum processing unit of a quantum computing system. A quantum program is communicated over a low-latency communication pathway from the classical computer system to the quantum computer system. The quantum program is executed at the quantum computer system.

21 Claims, 12 Drawing Sheets

Related U.S. Application Data

(60) Provisional application No. 62/725,156, filed on Aug. 30, 2018, provisional application No. 62/746,953, filed on Oct. 17, 2018.

(51) Int. Cl.
  *G06F 9/455* (2018.01)
  *H04L 67/06* (2022.01)
(58) Field of Classification Search
  USPC .......................................................... 716/134
  See application file for complete search history.

(56) References Cited

U.S. PATENT DOCUMENTS

| | | | |
|---|---|---|---|
| 9,774,401 | B1 | 9/2017 | Borrill |
| 9,935,937 | B1 | 4/2018 | Potlapally et al. |
| 10,127,499 | B1 | 11/2018 | Rigetti et al. |
| 10,637,142 | B1 | 4/2020 | Tran et al. |
| 10,824,478 | B2 | 11/2020 | Dadashikelayeh et al. |
| 10,873,794 | B2 | 12/2020 | Kulshreshtha et al. |
| 11,194,573 | B1 | 12/2021 | Smith |
| 11,323,919 | B1 | 5/2022 | Paraulkar et al. |
| 11,356,493 | B2 | 6/2022 | Oesterreicher |
| 11,797,872 | B2 | 10/2023 | Bocharov et al. |
| 2004/0019806 | A1 | 1/2004 | Beyh |
| 2011/0238378 | A1* | 9/2011 | Allen ................. G06N 10/00 702/186 |
| 2013/0304903 | A1 | 11/2013 | Mick et al. |
| 2014/0337612 | A1* | 11/2014 | Williams ............... G06N 10/00 713/100 |
| 2016/0125311 | A1 | 5/2016 | Fuechsle et al. |
| 2017/0357539 | A1 | 12/2017 | Dadashikelayeh et al. |
| 2018/0062764 | A1 | 3/2018 | Borrill |
| 2018/0091440 | A1 | 3/2018 | Dadashikelayeh et al. |
| 2018/0157986 | A1 | 6/2018 | Oxford et al. |
| 2018/0368007 | A1 | 12/2018 | Cummings |
| 2019/0007051 | A1 | 1/2019 | Sete et al. |
| 2019/0049495 | A1* | 2/2019 | Ofek .................... G06F 9/5027 |
| 2020/0175000 | A1 | 6/2020 | Borrill |
| 2020/0177671 | A1 | 6/2020 | Tofighbakhsh et al. |
| 2020/0178149 | A1 | 6/2020 | Seenappa et al. |
| 2020/0257566 | A1 | 8/2020 | Ganguli et al. |
| 2020/0329114 | A1 | 10/2020 | Bahl et al. |
| 2020/0334563 | A1 | 10/2020 | Gambetta et al. |
| 2020/0358719 | A1 | 11/2020 | Mestery et al. |
| 2020/0404069 | A1 | 12/2020 | Li et al. |
| 2021/0157622 | A1 | 5/2021 | Ananthapur Bache et al. |
| 2021/0157662 | A1 | 5/2021 | Heckey et al. |
| 2021/0158199 | A1 | 5/2021 | Heckey et al. |
| 2021/0158232 | A1 | 5/2021 | Bolt et al. |
| 2021/0158425 | A1 | 5/2021 | Kasprowicz et al. |
| 2021/0173588 | A1 | 6/2021 | Kannan et al. |
| 2021/0173660 | A1 | 6/2021 | Hogaboam et al. |
| 2021/0176055 | A1 | 6/2021 | Rahman et al. |
| 2021/0208943 | A1 | 7/2021 | Baughman et al. |
| 2021/0233045 | A1 | 7/2021 | Singh et al. |
| 2021/0256414 | A1 | 8/2021 | Kachman et al. |
| 2021/0263667 | A1 | 8/2021 | Whitlock et al. |
| 2021/0286601 | A1 | 9/2021 | Fitzsimons et al. |
| 2021/0313973 | A1 | 10/2021 | Cohen et al. |
| 2021/0334081 | A1 | 10/2021 | Chong et al. |
| 2022/0050797 | A1 | 2/2022 | Dreier et al. |
| 2022/0084085 | A1 | 3/2022 | Rigetti et al. |
| 2022/0164693 | A1 | 5/2022 | Tezak et al. |
| 2022/0374390 | A1 | 11/2022 | Chong et al. |

OTHER PUBLICATIONS

EPO, Extended European Search Report mailed May 9, 2022, in EP 19854101.3, 12 pgs.

Britt, et al., "High-Performance Computing with Quantum Processing Units", ACM Journal on Emerging Technologies in Computing Systems, vol. 13, No. 3, Mar. 2017, 13 pgs.

Britt, et al., "Quantum Accelerators for High-Performance Computing Systems", arXiv:1712.01423v1, Dec. 5, 2017, 7 pgs.

Devitt, "Performing Quantum Computing Experiments in the Cloud", arXiv:1605.05709v4, Sep. 1, 2016, 29 pgs.

McCaskey, et al., "Hybrid Programming for Near-term Quantum Computing Systems", arXiv:1805.09279v1, May 23, 2018, 9 pgs.

USPTO, Final Office Action mailed Feb. 24, 2023, in U.S. Appl. No. 17/172,673, 28 pgs.

KIPO, International Search Report and Written Opinion mailed Jan. 17, 2020, in PCT/US2019/049090, 12 pgs.

Farhi, E., et al., "A Quantum Approximate Optimization Algorithm", arXiv:1411.4028v1 [quant-ph], Nov. 14, 2014, 16 pages.

Jones, et al., "Scalable instrumentation for general purpose quantum computers", Bulletin of the American Physical Society, Mar. 2019, 4 pgs.

Karalekas, et al., "Compiler Tools for Hybrid Quantum-Classical Algorithms", APS March Meeting, Boston, MA, Mar. 5, 2019, 38 pgs.

McClean, et al., "Barren plateaus in quantum neural network training landscapes", Nature Communications, vol. 9, No. 4812, Nov. 2018, 6 pgs.

McClean, et al., "The theory of variational hybrid quantum-classical algorithms", New J. Phys. 18 (2016)023023, Feb. 5, 2016, 23 pgs.

Preskill, "Quantum Computing in the NISQ era and beyond", Quantum, vol. 2, pp. 79, Jul. 30, 2018, 21 pgs.

Riste, et al., "Feedback Control of a Solid-State Qubit Using High-Fidelity Projective Measurement", PhysRevLett.109.240502, Dec. 10, 2012, 5 pgs.

Smelyanskiy, et al., "qHIPSTER: The Quantum High Performance Software Testing Environment", retrieved on Dec. 30, 2019; arXiv:1601.07195v2, Jan. 2016, 10 pgs.

Smith, R. S., et al., "A Practical Quantum Instruction Set Architecture", arXiv:1608.03355v2 [quant-ph], Feb. 17, 2017, 15 pages.

Smith, Robert S, et al., "A Practical Quantum Instruction Set Architecture", arXiv:1608.03355v1 [quant-ph], Aug. 11, 2016, 14 pages.

USPTO, Non-Final Office Action issued in U.S. Appl. No. 17/172,673 on Jul. 19, 2023, 28 pages.

USPTO, Final Office Action issued in U.S. Appl. No. 17/172,673 on Dec. 21, 2023, 35 pages.

EPO, Communication pursuant to Article 94(3) issued in Application No. 19854101.3 on Aug. 20, 2024, 20 pages.

Chong, Frederic T., et al., "Programming language and complier design for realistic quantum hardware", Nature, vol. 549, Sep. 14, 2017, pp. 180-187, 8 pages.

* cited by examiner

LOW-LATENCY, HIGH-PERFORMANCE HYBRID COMPUTING

CROSS-REFERENCE TO RELATED APPLICATIONS

This application is a continuation of PCT/US2019/049090 filed Aug. 30, 2019, which claims priority to U.S. Provisional Application No. 62/725,156 filed Aug. 30, 2018 and entitled "Low Latency, High Performance Computing Systems and Methods," and to U.S. Provisional Application No. 62/746,953 filed Oct. 17, 2018 and entitled "Low Latency, High Performance Computing Systems and Methods." The entire contents of the above-referenced priority applications are hereby incorporated by reference.

BACKGROUND

The following description relates to low-latency, high-performance hybrid classical/quantum computing.

Quantum computers can perform computational tasks by storing and processing information within quantum states of quantum systems. For example, qubits (i.e., quantum bits) can be stored in and represented by an effective two-level sub-manifold of a quantum coherent physical system. A variety of physical systems have been proposed for quantum computing applications. Examples include superconducting circuits, trapped ions, spin systems and others.

DETAILED DESCRIPTION

Figure 1:
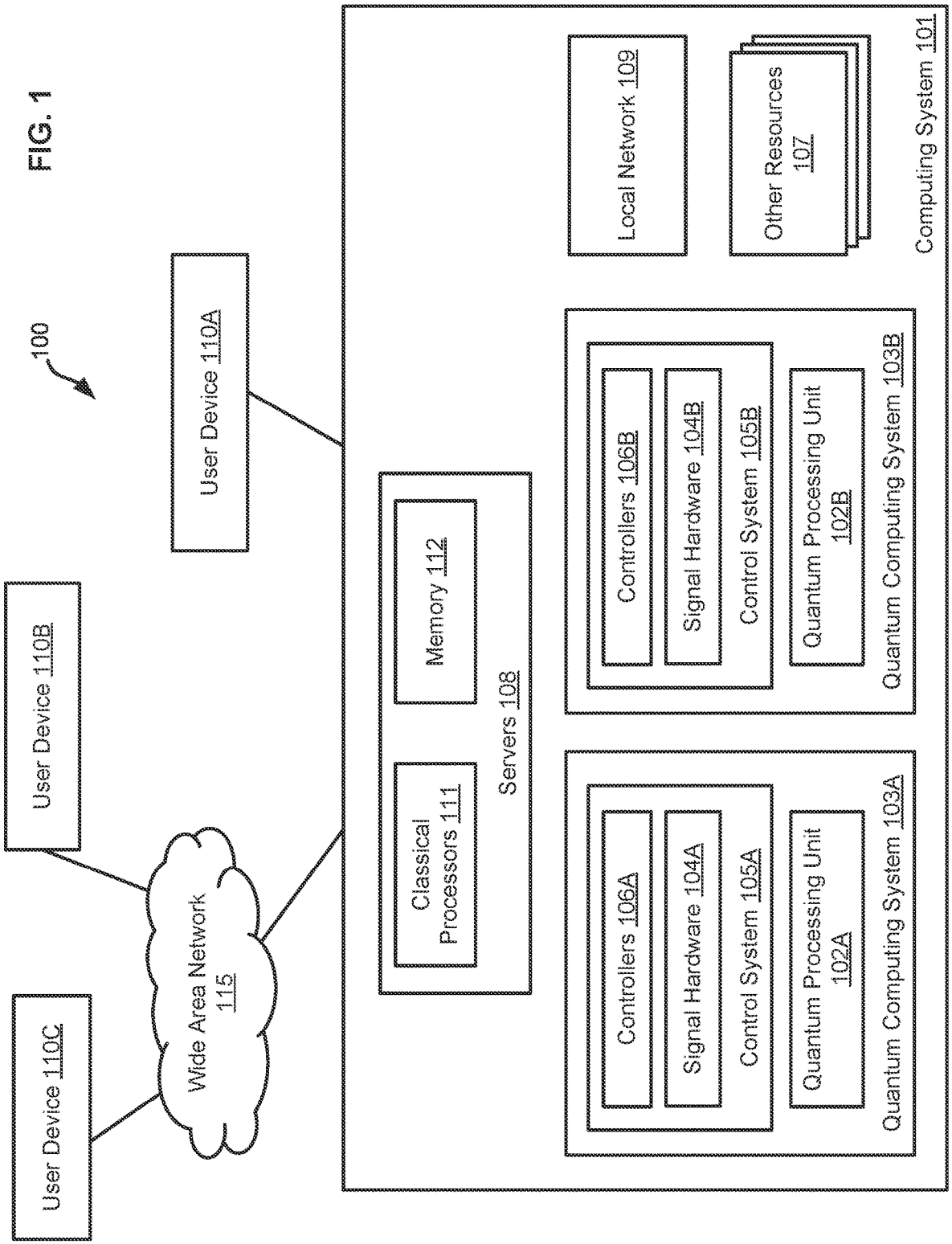
FIG. 1 is a block diagram of an example computing system.

In some aspects of what is described here, a quantum machine image (QMI) interacts with a quantum processor unit (QPU) by communicating over a low-latency communication pathway. Low-latency communication pathways can provide fast exchange of signals (e.g., electrical signals, photonic signals, etc.) between the QMI and the QPU (e.g., between the computing systems in which they operate), and low-latency channels can be provided at various stages of communication from the QMI to the QPU and vice versa. In some instances, the use of low-latency channels, as well as other systems and techniques described here, can provide technical improvements and advantages over existing approaches. For instance, the systems and techniques described here may be used to improve resource utilization and reduce the overall time required to execute programs in a computing environment that utilizes one or more QPUs.

In some instances, the use of low-latency communication channels can reduce the time duration between a program being transmitted from the QMI (to control systems of the QPU) and output data being received at the QMI (from the control systems of the QPU), while allowing for execution time of the same program at the QPU. In some instances, the use of low-latency communication channels can reduce the time duration between (1) the time when the QMI issues an instruction of change of memory (e.g., for a variational parameter update or binary patching operation) and (2) the time when the change of memory can affect the course of the program execution; for instance, the time duration may be reduced to sub-coherence time (e.g., less than the coherence time of qubits defined in the QPU).

In some instances, a computing environment operates a QPU in a manner that allows faster iteration of programs on the QPU. For example, low-latency communication, active qubit reset, updatable binary programs or a combination of these and other systems and techniques may be used to improve QPU utilization time. In some cases, the systems and techniques described here may improve "shot-to-shot latency" in a quantum computing system, for example, reducing the amount of time between the end of one iteration of a program and a subsequent iteration of the same program. In some cases, the systems and techniques described here may improve "serial latency" in a quantum computing system, for example, reducing the amount of time it takes between the end of one executed program and the start of a different executed program.

In some hybrid classical/quantum algorithms, the quantum computational tasks are parametric. For example, on each iteration within a variational execution model, the sequence of instructions in the quantum program may be constant, and only the arguments of certain instructions change between iterations. In some cases, a compiler can leverage this parametric structure to improve the speed of execution. Such a compiler can be constructed based on the physical implementation of the quantum program. For instance, superconducting quantum processors and many other QPU implementations control qubits using radio-frequency arbitrary waveform generators (AWGs). Each qubit may be coupled to its own drive line, and the AWG may send calibrated microwave pulses to carefully manipulate the qubit's state. Additionally, the AWG can track the reference frame of each qubit that it controls, as certain instructions change the phase of future microwave pulses.

Figure 7:
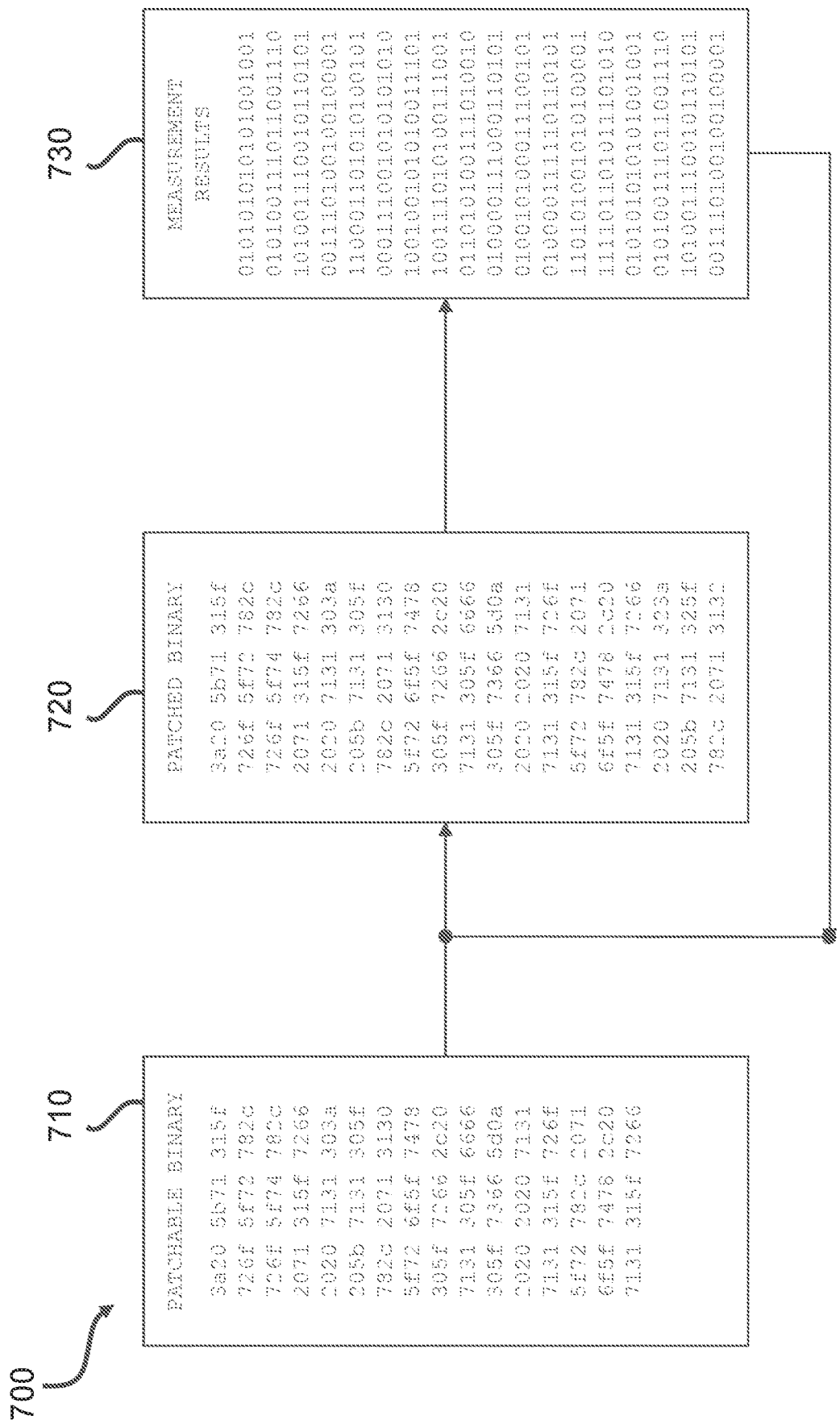
FIG. 7 is a diagram of an example fast hybrid execution process.

Within this context, the parameters of a variational algorithm can be directly related to parameters of the quantum program, such as, for example, phase updates of a qubit's reference frame. For instance, by implementing parametric compilation, SHIFT-PHASE operations can reference data memory segments of the binary program, and the data memory segments can be updated at runtime (e.g., as shown in FIG. 7). Thus, for a given variational algorithm, the underlying parametric structure can be compiled once before starting the iteration loop, and the binary program's data memory can be updated from step to step (e.g., as shown in FIG. 7). Using parametric compilation, serial latency can be reduced significantly (in some examples, from 199 ms to 36 ms, a more than 5× improvement).

Figure 12:
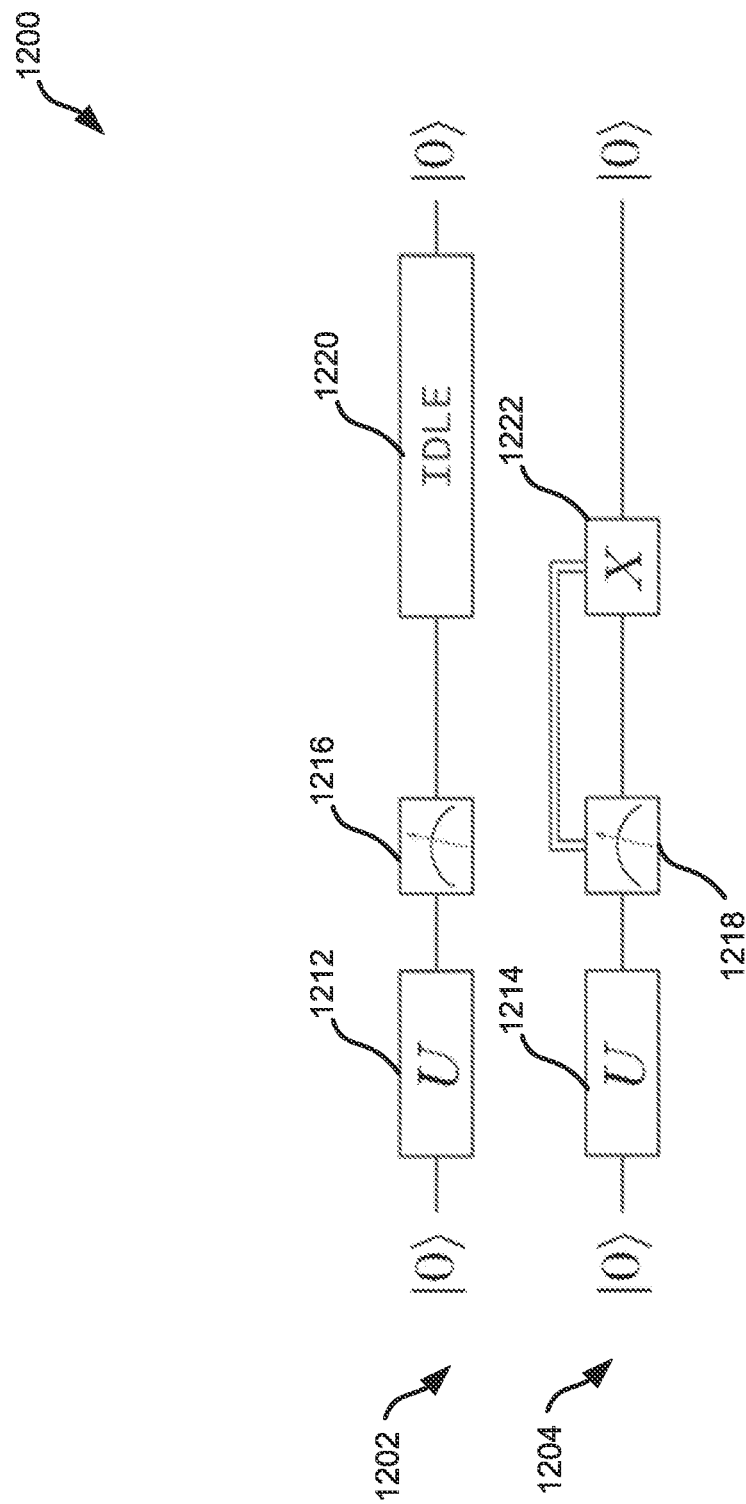
FIG. 12 is a quantum logic circuit diagram showing example qubit reset operations.

In some systems, active qubit reset can be used to improve the speed of execution. Generally, a quantum register starts in some known state at the beginning of each quantum program. In some cases, qubit reset may be performed passively, by waiting for the qubits to relax to their ground states. However, the relaxation process is also an error process in the computation and so the passive reset time generally increases as qubit performance gets better. Rather than waiting for qubits to relax, an active qubit reset process can be used to efficiently set all qubits to their ground states at the end of a computation. Active qubit reset may be accomplished, for example, by quickly feeding back on the measured state of a qubit, and flipping it if necessary (e.g., as shown in FIG. 12). The conditional control flow may be executed on a timescale comparable to the control gates, and may be much shorter than the communication latency from QPU to CPU in a hybrid application.

In some cases, to implement a classical feedback loop for active qubit reset, a translation toolchain can propagate control flow structures down to the hardware pulse sequencers. Coupled with the ability to broadcast qubit measurement results across the control system, active reset can be implemented as an if-else control flow. Broadcasting measurement results can be completed in about 1 μs, which gives an overall time of about 3 is to complete a single round of active reset. Gates and measurement are imperfect operations, and so this feedback can be repeated three times to drive the preparation error below 1%. Thus, this active process for resetting qubits can be, for example, an order of magnitude faster than passive reset. In some examples, active reset decreased shot-to-shot latency from about 100 us to 16 μs, once again a more than 5× improvement.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109 and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109 or otherwise).

The user devices 110 shown in FIG. 1 may include one or more classical processor, memory, user interfaces, communication interfaces, and other components. For instance, the user devices 110 may be implemented as laptop computers, desktop computers, smartphones, tablets or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B and the other resources 107; the servers 108 can then send information to the user devices 110 based on output data from the computational tasks performed by the quantum computing systems 103A, 103B and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115 and possibly other channels. In some implementations, the servers 108 may include a host server, an application server, a virtual server or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random access memory (RAM), a storage device (e.g., a writable read-only memory (ROM) or others), a hard disk, or another type of storage medium. The memory 112 can include various forms of volatile or non-volatile memory, media and memory devices, etc.

Each of the example quantum computing systems 103A, 103B operates as a quantum computing resource in the computing system 101. The other resources 107 may include additional quantum computing resources (e.g., quantum computing systems, quantum virtual machines (QVMs) or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a quantum virtual machine, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or quantum virtual machines. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may be expressed in another form or format.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise). In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 104 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, the cloud-based QC environment is implemented using a resource such as, for example, OPENSTACK®. OPENSTACK® is an example of a software platform for cloud-based computing, which can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processor units 102A, 102B, and interact with a remote user device (110B or 110C) to provide a user programming environment. The QMI may operate in close physical proximity to and have a low-latency communication link with the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum virtual machines (QVMs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some examples, hybrid classical/quantum algorithms may employ a variational execution model in order to accomplish tasks such as, for example, solving combinatorial optimization problems or simulating quantum chemistry. To execute hybrid classical/quantum algorithms according to this model, the server 108 can generate an initial quantum program (e.g., based on a proposed solution to a problem, starting with an initial guess, etc.), and send the initial quantum program to quantum computer resource (e.g., the quantum computer system 103A, the quantum computer system 103B, a QVM, or a combination of them) for execution. Then, from the output of executing the initial quantum program, a classical optimizer running on the server 108 (or another classical computer resource) may update the quantum program for the next round of iteration on the quantum computer resource. Depending on the difficulty of the problem, the quality of the quantum computer resource, and other factors, the iteration loop may be repeated many times before completing the computational task. In some implementations, low-latency hybrid classical/quantum computing can be achieved, for example, when a QMI operates on a classical machine that is physically located close to a QPU.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processing unit 102A to operate qubit devices, readout devices, bias devices, coupler devices or other types of components in the quantum processing unit 102A.

In some instances, the signal hardware 104A receives and processes signals from the quantum processing unit 102A.

The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing unit 102A. In some instances, signal delivery hardware performs preprocessing, signal conditioning or other operations on readout signals received from the quantum processing unit 102A.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitstrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

Figure 2:
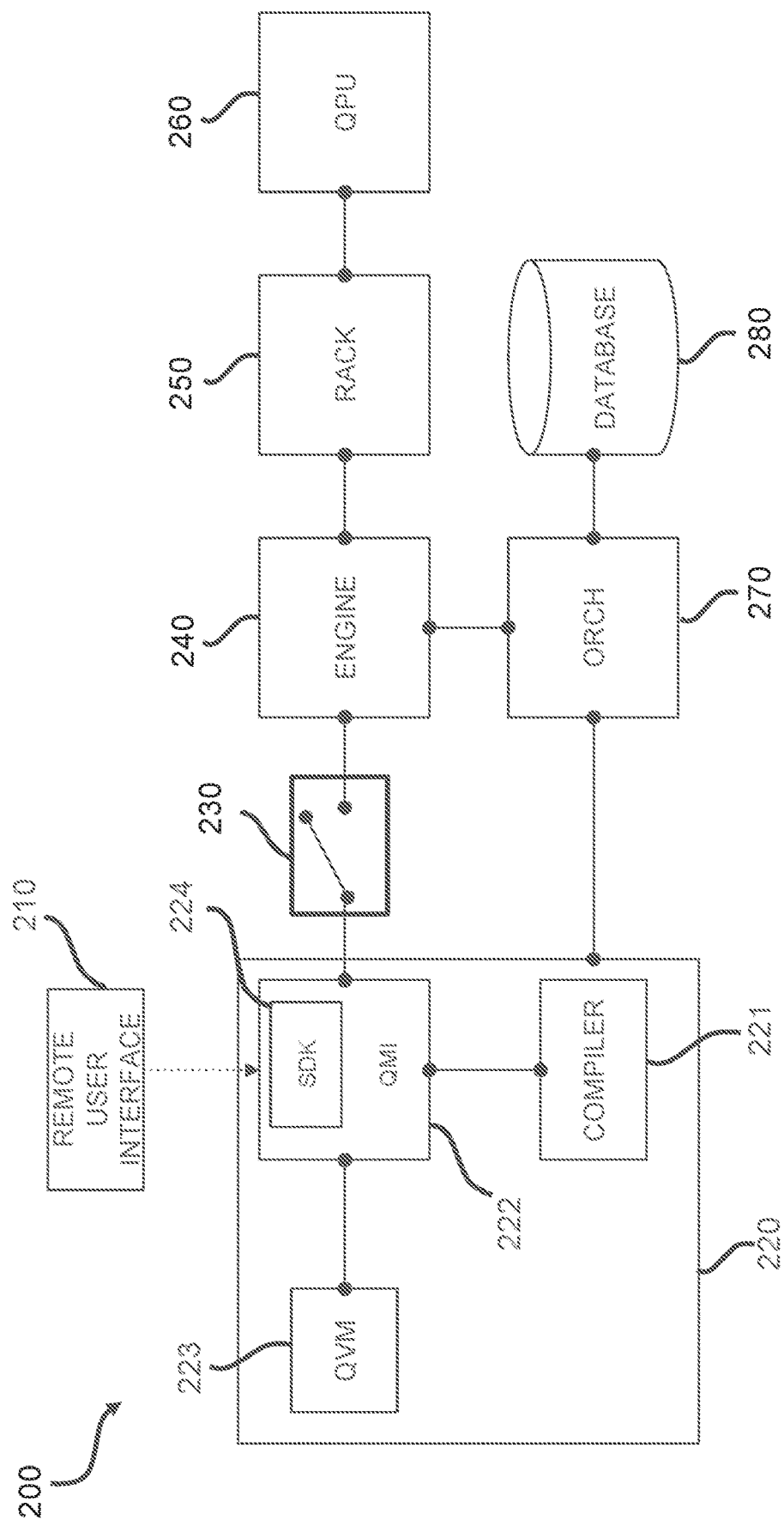
FIG. 2 is a schematic representation of an example low-latency computing system.

FIG. 2 is a schematic representation of an example low-latency computing system 200. In some implementations, elements of the example computing environment 100 shown in FIG. 1 can be cast with an architecture illustrated by the example system 200 shown in FIG. 2. The example system 200 shown in FIG. 2 includes a remote user interface 210 connected to a QMI 222 in the host server 220 via a communication link, which may be via the cloud, the internet, or some other communication link. For example, the remote user interface 210 in FIG. 2 may be provided on one of the remote user devices 110B, 110C in FIG. 1; the host server 220 in FIG. 2 may be implemented as one or more of the servers 108 in FIG. 1; and the user interface 210 may communicate with the QMI 222 via the wide area network 115 in FIG. 1.

The example host server 220 shown in FIG. 2 includes a quantum machine image (QMI) 222, which includes a programming environment and software development kit (SDK) 224. The host server 220 further includes a compiler 221 which allows the QMI 222 to convert device-independent quantum programs (e.g., Quil programs) into binary programs that can be sent to the engine 240 for execution. In the example shown in FIG. 2, the host server 220 includes a quantum virtual machine (QVM) 223, which allows the QMI 222 to classically simulate the execution of quantum programs. In some implementations, the SDK includes a QVM (e.g., for simulating smaller numbers of qubit; say less than 30 qubits). In some implementations, the QVM can operate on a separate high-performance computer that allows for simulating large number of qubits, for example, greater than 30 qubits. The compiler 221 can operate on a separate server, as part of the QMI 222 on the server 220, or otherwise.

In some cases, when the QMI 222 operates on the host server 220, the QMI 222 provides a virtualized execution environment for quantum programs (which may include hybrid classical/quantum programs). The virtualized representation of the execution environment allows many user accounts to concurrently utilize the hardware resources in the computing system 200 (e.g., rather than allocating distinct hardware elements to each user account). For instance, virtualized representations may provide each user account a respective QMI 222 that can be loaded on the host server 220 (e.g., concurrently) to access a collection of virtual resources (e.g., classical processors, memory, operating system, applications, etc.).

In some cases, the QMI 222 may be implemented as a virtual machine image that operates on virtual computing resource such as, for example, a virtual machine or a container. In some cases, the QMI 222 may be stored (e.g., as one or more files on the host server 220 or a storage server), for example, to save a configuration of an execution environment. For instance, a QMI 222 can be stored with default configuration settings, with user-defined configuration settings, or otherwise. Thus, the QMI 222 may represent a preconfigured execution environment.

The example system 200 shown in FIG. 2 includes an engine 240, a rack 250 and a QPU 260, which may operate together to form all or part of one or more quantum computing systems. For instance, the engine 240 in FIG. 2 may be implemented as described with respect to the controller 106A in FIG. 1; the rack 250 in FIG. 2 may be implemented as described with respect to the signal hardware 104A in FIG. 1; and the QPU 260 in FIG. 2 may be implemented as described with respect to the QPU 102A in FIG. 1.

The engine 240 may include instrument drivers and other components that operate to manage the rack 250 and broker communications with the QPU 260. The rack 250 generates control signals (e.g., radio, microwave, optical, DC, etc.) that control the elements of the QPU 260. The QPU 260 can include, for example, a superconducting quantum integrated circuit comprising an array of qubits and resonators or another type of quantum hardware. The QPU 260 may be kept in a cryogenic environment (e.g., maintained by a dilution refrigerator) or another type of controlled environment during operation.

As shown in FIG. 2, the example host server 220 is connected to the QPU 260 through a low-latency switchable link 230, which is represented in FIG. 2 as a switch with an open and a closed position. The switchable link 230 can be implemented in software (e.g., as a virtual switch), firmware, hardware, or otherwise. In some cases, the switchable link 230 provides a connection to a high speed Ethernet cable or another kind of wired communication link. As shown in FIG. 2, the switchable link 230 provides a communication channel between the host server 220 and the engine 240.

In some example systems, the physical connections between the host server 220 and the engine 240, between the engine 240 and the rack 250, and between the rack 250 and the QPU 260 form a low-latency communication pathway between the QMI 222 and the QPU 260. The physical connections may be provided, for example, by a 10 Gb (gigabit) Ethernet that falls within one or more of the IEEE 802.3 working group standards (e.g., IEEE 802.3-2015). For instance, the connections from the rack 250 to the QPU 260 may include 2×10 Gb Ethernet connections with a single mode fiber going to every fridge, configured in an active-active bond. The equipment in the rack 250 may include a Cisco Nexus 3k, which may be connected to the server 220 with direct-attached SFP cables (aka DAC cables). The fridge rack may include Cisco SG550XG switches connected to the control equipment with DAC cables as well. In some cases, SFP+ transceivers may be used. Such equipment may operate in the system 200 as a communication channel that provides a low-latency communication pathway from the host server 220 to the engine 240, the rack 250 and the QPU 260.

The example system 200 shown in FIG. 2 includes an orchestrator 270 and a database 280, which may be implemented using classical computing resources. For instance, the orchestrator 270 and the database 280 in FIG. 2 may be implemented on one or more servers or controllers (e.g., the servers 108, controllers 106A, 106B in FIG. 1) or another type of system. The example orchestrator 270 facilitates communication between the QMI 222 and the engine 240. In some implementations, the orchestrator 270 can be in a separate server. As shown in FIG. 2, the orchestrator 270 may communicate with the database 280. The database 280 stores information that may be utilized by the compiler 221 and quantum engine 240, for example, configuration and calibration information for the QPU 260 and other types of information.

In some aspects of operation, a secured connection is established between the host server 220 and the remote user interface 210. For instance, the secured connection may be established by SCP (e.g., by SSH) over a public communication channel such as, for example, the Internet. The QMI 222 operating on the host server 220 generates programs in response to instructions received from the remote user interface 210 over the secured connection. The programs and related data may be communicated over low-latency communication pathways between the host server 220, the engine 240, the rack 250 and the QPU 260. The programs are executed by the QPU 260, and results of program executions (e.g., measurement outcomes, etc.) may be sent to the QMI 222 over the low-latency communication pathway.

In some instances, low-latency hybrid classical/quantum programming can be enabled by placing the user's programming environment physically close to the QPU 260. In some cases, this proximity is enabled by allowing users to SSH from their remote user interface 210 anywhere in the world (e.g., from a distance that may be orders of magnitude greater than 1.0 km) to their QMI 222, which is located in close physical proximity to the QPU 260 (e.g., less than 1.0 km or 0.5 km from the QPU 260). In some cases, where engagement with the QPU 260 is a scarce event due to limited quantum resources, not every user can simultaneously have access to the QPU 260. When a user's QMI 222 has access to a quantum resource, then the user's QMI 222 is QPU-engaged. Otherwise, the QMI 222 is disengaged. In some implementations, the engagement process is comprised of a defined list of tasks that allows the QMI 222 to obtain access to the quantum resource. In some cases, if there are enough quantum resources, the engagement process can be automatic.

In some implementations, once a user's account is connected to the QMI 222, the user may develop quantum programs (which may include hybrid classical/quantum programs), for example, using quantum instruction languages (e.g, Quil). The generated quantum programs are not necessarily readable by the electronics in the rack 250. In some implementations, the quantum programs are transformed into instrument commands before the programs can be used to manipulate the state of the QPU 260. A quantum compilation process can take a quantum program as input and produce instrument binaries as output. For example, the quantum compilation process can be done by the compiler 221 in FIG. 2 and passed on to the engine 240, which may directly communicate the outputs to the rack 250.

Figure 6:
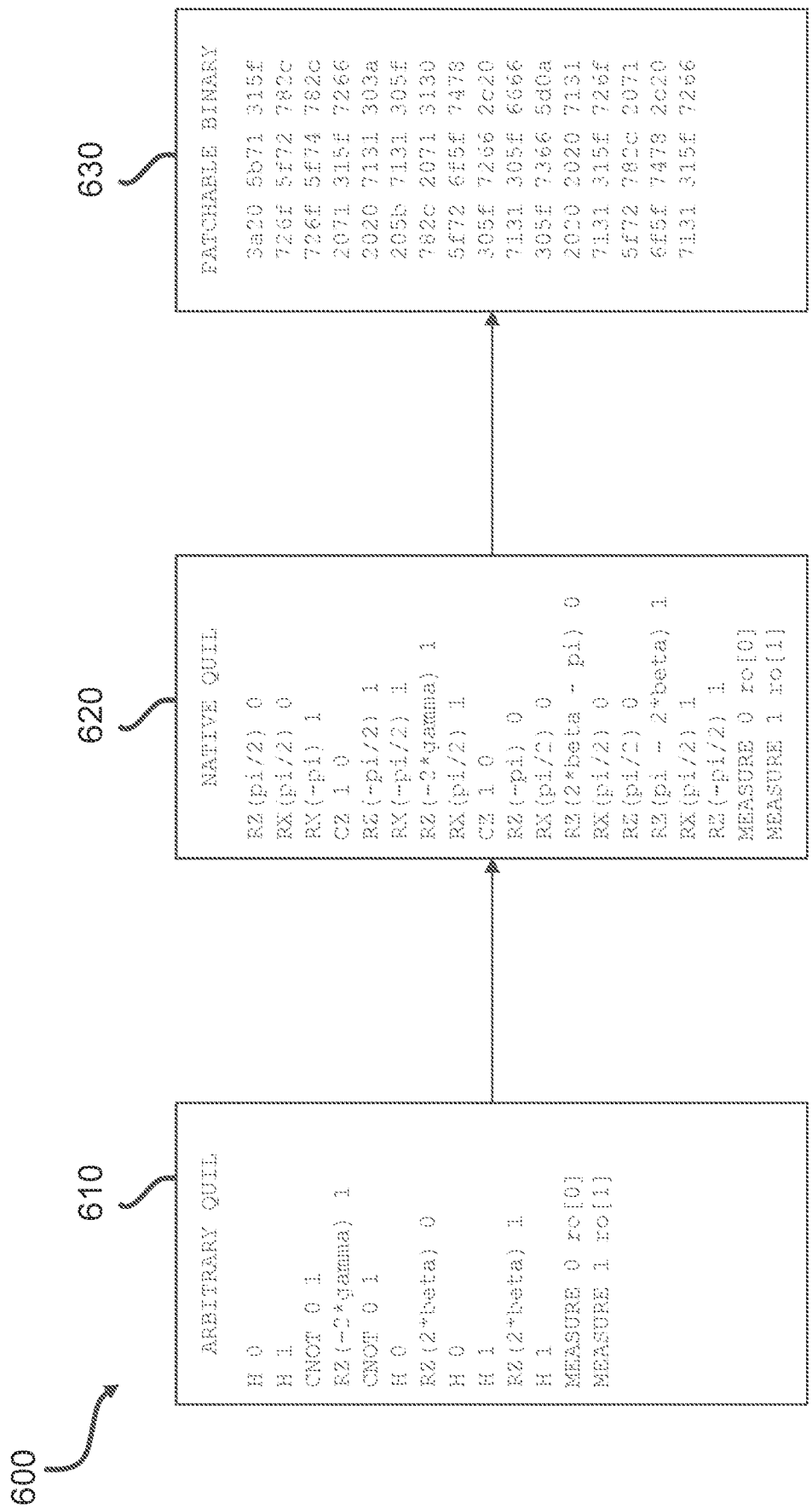
FIG. 6 shows an example binary compilation process.

The QMI 222 may become QPU-engaged by establishing a connection with the QPU 260 (e.g., by closing the switchable link 230). When the QMI 222 is QPU-engaged and the compiler 221 has compiled the quantum program into instrument binaries, the QMI 222 may obtain access to the engine 240 where the instrument binaries are loaded and run. In the computing system shown in FIG. 2, the run time can be optimized for hybrid classical/quantum execution, for example, using binary patching and possibly other techniques. Binary patching can be accomplished, for example, by updating a partial binary program for execution (e.g., by filling in an incomplete data memory section of an instrument binary that has instructions in its instruction memory that reference incomplete entries in that data memory section). An example binary patching process is shown in FIGS. 6 and 7; binary patching may be implemented in another manner in some cases.

In some implementations, low-latency hybrid execution may be enhanced by an active reset process or another process that quickly sets all or individual qubits in the QPU 260 to a fiducial state (e.g., the ground state or another basis state). Such an active reset process may reduce the delay between running successive programs on the QPU 260, by as much as an order of magnitude in some instances. An example active reset process is shown in FIG. 12; fast reset may be implemented in another manner in some cases.

Figure 3:
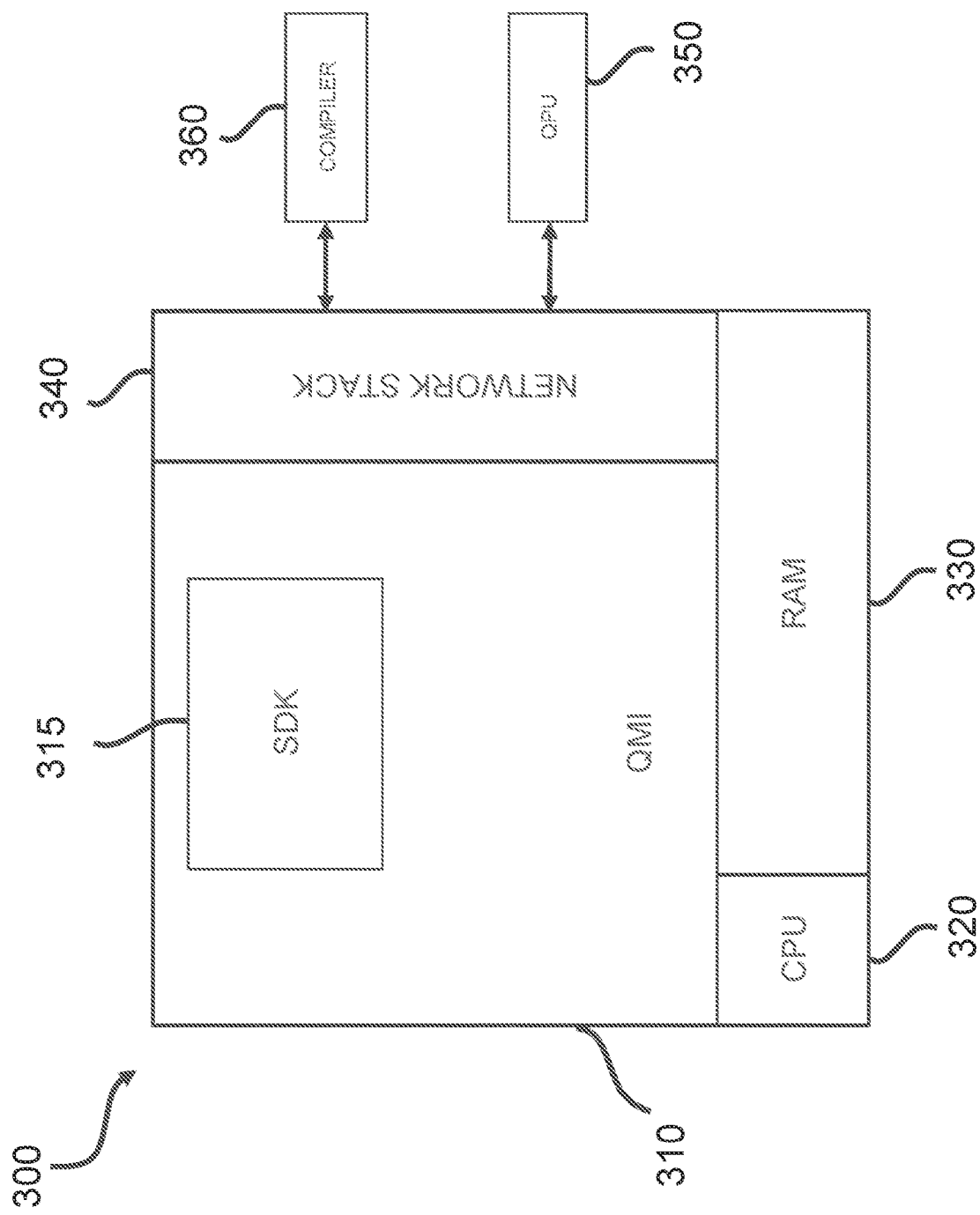
FIG. 3 is a schematic representation of an example quantum machine image (QMI) configuration.

FIG. 3 is a schematic representation of an example quantum machine image (QMI) configuration 300. The example QMI configuration 300 shown in FIG. 3 includes a classical processing unit (CPU) 320 that is powerful enough to perform mathematical optimization routines such as Nelder-Mead, for example, rapidly enough to be within the hybrid classical/quantum program execution loop, or to perform post-processing/analysis on data taken from the QPU 350. For more information on Nelder-Mead, see, for example, the 1965 publication entitled "A simplex method for function minimization" by Nelder and Mead. The QMI configuration 300 also includes a QMI 310 that includes a quantum software development kit (SDK) 315. In some implementations, where each user account has a QMI 310 and resource latency is important, the QMI 310 can be packaged as a virtual machine image. Packaging the QMI 310 as a virtual machine image may facilitate easy replication and migration of the QMI 310. In some case, virtual packaging allows full control of the underlying network stack 340 and classical resources (e.g., random access memory (RAM) 330 and classical processing unit (CPU) 320).

In some cases, the underlying machine architecture being targeted by a quantum compiler is not static. Thus, the QMI 310 can be configured/reconfigured according to the quantum resource that is being targeted for execution. The configuration information may be accessed from a database (e.g., the database 280 shown in FIG. 2). In the example shown, the QMI 310 is deployed on-premises with the QPU 350, to allow the QMI 310 to establish low-latency access to the QPU. In some implementations, hybrid classical/quantum programming benefits from a tight coupling between the QPU 350 and the CPU 320 (e.g., to perform optimization over a parameter space), so a short-distance high-speed, high-bandwidth network connection may be used; for example, with a high-speed, high-bandwidth network connection between the QPU 350 and the CPU 320, these two processors can be co-located anywhere in the same facility (and perhaps even be up to roughly 1 km apart) and have a low-latency connection with each other.

In some implementations, when users have access to a preconfigured quantum programming environment (such as, for example, PYQUIL®) on the QMI 310, they can build quantum programs, compile them to instrument binaries using a compiler 360, and execute them on the QPU 350. In some cases, in order to further accelerate the classical optimization component of the hybrid classical/quantum programming loop, a graphical processing unit (GPU) (not shown) can be leveraged in addition to the CPU 320. For instance, the GPU may be deployed as one of the other resources 107 in FIG. 1 or otherwise. In some instances, (e.g., when quantum resources are scarce), the QMI 310 can access a quantum virtual machine (e.g., the QVM 223 shown FIG. 2) as a development tool to test or debug their quantum programs between scheduled QPU access time. In some cases, the QMI 310 can run a quantum program on the QVM to benchmark the quantum program. In addition to the base quantum programming environment, the QMI 310 can include a quantum SDK 315 with tools for composing quantum programs for various applications, for example, for quantum chemistry simulations or machine learning. For example, the SDK 315 may include resources such as Grove, which is a python library comprised of a suite of canonical quantum algorithms, such as Grover's search algorithm and benchmarking routines such as quantum process tomography. Other examples of applications that may be suitable for an SDK are ProteinQure (a tool for protein folding on top of Quil) and pyGSTi (a python library for building gate set tomography programs).

In some implementations, additional high-performance computing resources can be used for some applications of quantum computing, for example, where the post processing and analysis of data output from the QPU is more (classical) resource intensive than is practical to provide on every QMI. This problem can be mitigated by providing access to an external high-performance computing (HPC) cluster on which data analysis jobs can be scheduled. In some cases, in addition to the on-QMI storage that user accounts have for their transient QPU data, users can have the option of storing results in a persistent data storage system, which may be a centralized high-performance system.

In some implementations, the QMI 222 is allocated to a user account when a new user signs up. A user account may be associated with a user identification, a user e-mail address, an IP address, or another type of identifier. When a user signs up for a user account to access service on the computing system 200, a notification may be sent to the orchestrator 270, which may initiate the allocation process. For example, like a virtual machine, the QMI 222 can be partitioned from a base operating system (OS) image and may be allocated some collection of classical resources (e.g., CPU cores, RAM, and disk space). The partitioning and the allocation generally occur on one of the servers that is used for storing QMIs. Once the image has been partitioned and classical resources have been allocated, then the quantum programming environment and potentially SDK 224 can be installed or loaded. In some implementations, the network stack is configured such that the QMI 222 can be accessible from the internet via SSH or secure copy protocol (SCP) and such that it can communicate with the other components of the computing system 200.

In some implementations, QMI upgrades can be done while the computing system 200 is down or at other times. In some cases, the compiler 221 or QVM 223 can be upgraded without interacting with the QMI 222. For other components (e.g., the SDK 224), users can be responsible for maintaining or upgrading versions as necessary. Upgrades and system maintenance may be provided in another manner.

Figure 4:
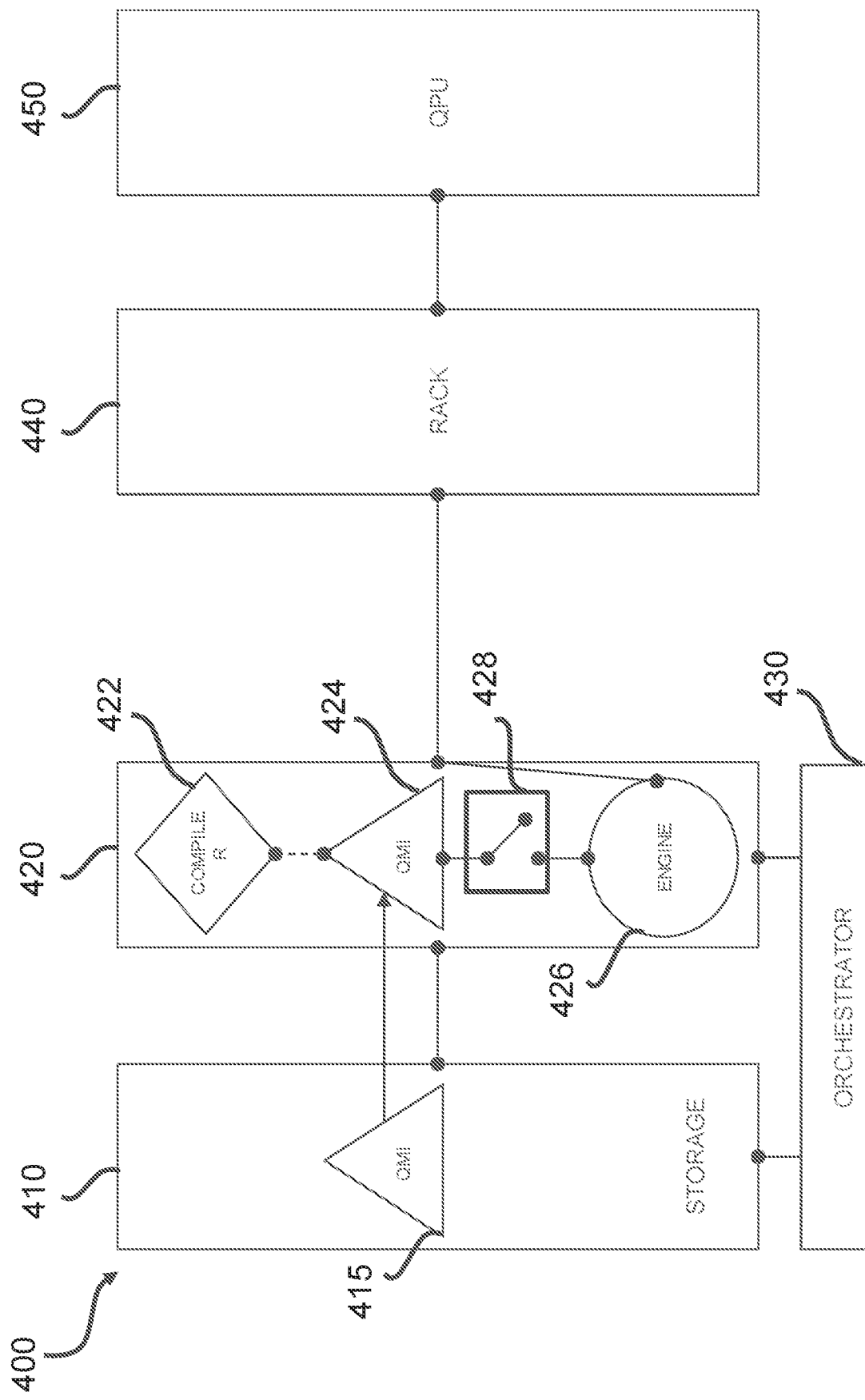
FIG. 4 is a schematic representation of an example quantum processing unit (QPU) engagement process.

FIG. 4 is a schematic representation of an example quantum processing unit (QPU) engagement process 400. The example QPU engagement process 400 shown in FIG. 4 includes a storage server 410 which includes a QMI 415. The storage server 410 can be located remote from the low-latency compute server 420; for example, the storage server 410 may be located at a data center. When the QMI 415 resides on the storage server 410, the QMI 415 is accessible through a wide area network (e.g., from the Internet), but may not have access to the full suite of compute resources of a quantum-enabled computer system (e.g., the computing system 101 in FIG. 1, the computing system 200 in FIG. 2), and the QMI 415 on the storage server 410 will not have a low-latency link to the QPU 450. An engagement process may be executed to enable access to some of these resources, and QPU engagement may be executed to enable access to a quantum resource (e.g., QPU 450).

In some implementations, the QPU engagement process includes moving the QMI 415 from the storage server 410 to the low-latency compute server 420. For example, a QMI stored on a remote server can be moved on-premises to a low-latency compute server when a user account is engaged. In the example shown in FIG. 4, the storage server 410 has slower access, is less powerful, and is optimized for storage, whereas the low-latency compute server 420 has faster access, is more powerful, may have a local network connection to the rack 440, and may be optimized for low-latency execution. The QPU engagement process may include moving the QMI 415 from the storage server 410 to the low-latency compute server 420 and connecting the QMI 415 to the QPU 450. The QPU engagement process may further include updating the QMI with the operating points and parameters of the QPU 450. This update may initiate due to changes in the underlying quantum instruction set architecture (ISA), a change in the QPU 450 that the instrument rack 440 is accessing, a change in the characteristics of the QPU 450, or a combination of these and other factors. When the QMI 424 becomes engaged with a QPU 450, the compiler 422 and the quantum execution engine 426 can be reconfigured to target the ISA, the rack 440, and calibration specifications (e.g., operating points, pulses, etc.) for that particular QPU 450. The orchestrator 430 can perform restarting, along with providing appropriate configuration information to the compiler 422 and the engine 426. The QPU engagement process may further include allowing network communication between the QMI 424 and the rack 440 corresponding to the QPU 450 that the QMI 424 has engaged. The orchestrator 430 may facilitate communication between the QMI 424 and the rack 440. For example, radios in the rack 440 can be Ethernet devices that are all connected to the same Ethernet switch 428, for example, forming a subnet. The subnet may be inaccessible from the user device by default, and the subnet may become accessible to the user device when the user's QMI is engaged, in some implementations.

In some implementations, a computing environment can be configured to optimize a particular type of execution. For example, a computing system can be configured/reconfigured to emphasize MAXCUT-style parametrized ansatz hybrid classical/quantum programs that involve a (classical) optimization loop. Hybrid classical/quantum programs with a MAXCUT-style parametrized ansatz can be run faster on a computing system when the overall structure of the programs does not change between runs, for example. In some implementations, only the angle parameters that define the cost function or the variational state change from run-to-run, avoiding changing the overall pulse program on the QPU. After compilation, the angle parameter differences can be resolved entirely in software on a CPU. In some cases, low-latency execution of these and other types of hybrid classical/quantum program may be achieved using a combination of binary patching, active reset, and fast classical feedback.

Figure 5:
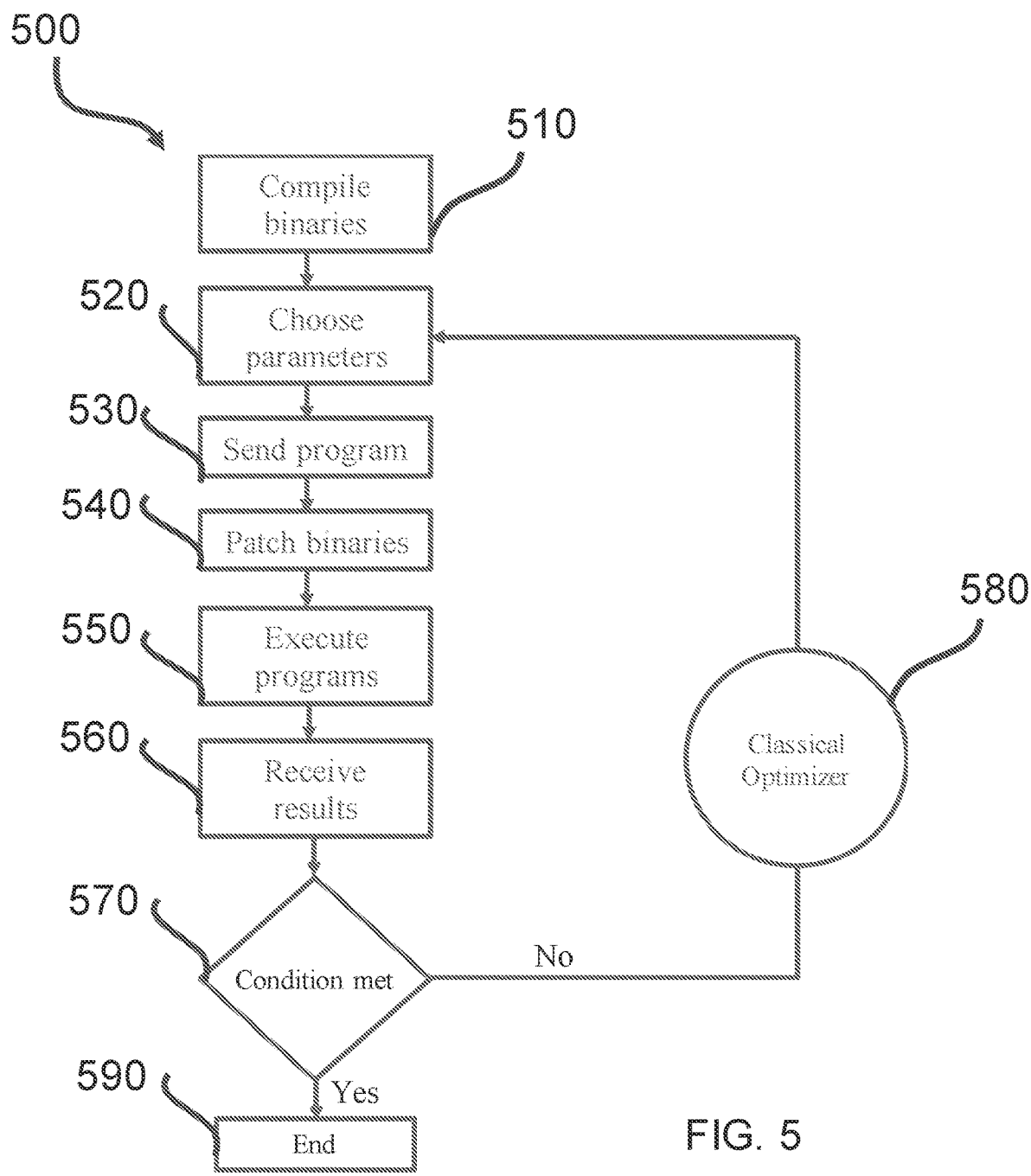
FIG. 5 is a flow chart showing an example hybrid classical/quantum program execution process.

FIG. 5 is a flow chart showing an example hybrid classical/quantum program execution process 500. In some instances, the process 500 can be used to optimize or otherwise improve execution of a hybrid classical/quantum program such as, for example, a MAXCUT-style parametrized ansatz hybrid classical/quantum program. The process 500 may include additional or different operations, and in some cases, one or more of the operations may be performed in a different order. In some cases, one or more operations are repeated or iterated, for example, until a terminating condition is reached. In some cases, multiple operations can be combined or performed in parallel, or individual operations can be divided into multiple sub-operations.

The example process 500 can be performed by a computer system; for example, parts may be executed by a classical computer system, while other parts may be executed by a quantum computer system. The example process 500 can be controlled by a QMI operating on a classical computer system. For instance, in the example system 200 shown in FIG. 2, the QMI 222 may control the process 500 and utilize classical computing resources of the host server 220 or the engine 240, as well as the quantum computing resources provided by the QPU 260.

At 510, a quantum program written in a quantum instruction language is compiled to a set of parametric instrument binaries to form a binary program. For example, a quantum program written in Quil may be converted to a binary program by compiling the quantum program to parametric instrument binaries. At 520, a desired parameter set is accessed for collection of desired parameters. At 530, the parametric instrument binaries corresponding to the compiled quantum program are sent to a quantum computer system for execution (e.g., to an engine that provides access to a QPU). At 540, the parametric/patchable binaries are filled in with the desired parameters for the current run. At 550, the quantum program is executed on the QPU. At 560, the results of the execution at 550 by the QPU are received by the QMI. At 570, a decision engine determines whether further runs are necessary to satisfy the termination condition or whether the condition has already been reached. If the condition has already been reached, the loop is exited and the process ends at 590. If the condition has not been met, the process 500 proceeds to classical optimization at 580. At 580, using the results received at 560, an optimization engine performs classical optimization to compute the parameters for the next run. The new parameters are then chosen at 520, providing the desired parameter set, and the loop is repeated.

In some implementations, operations 520, 530 and 540 can be collapsed into the step of loading the parametric program onto the instruments once for all subsequent executions. In some cases, within each iteration only the parameter memory section of the binary program is updated, which can further reduce the time required to load settings onto the instruments.

In some implementations, parametric compilation may be used, for example, in the hybrid execution model represented by the process 500 or in other contexts. In some instances, parametric compilation includes two types of processes: (1) generating native programs, for example, using Quil, and (2) generating parametric binaries from the native programs. In general, programs written in Quil may not be directly implementable on actual QPUs. The programs in Quil can be referred to as being written in arbitrary Quil. The quantum programs can be written using different instruction languages. The space of potential quantum programs generally is quite large and grows quickly with the number of qubits. Mapping between a quantum instruction and its corresponding instrument instruction for some instructions can be complicated. Due to the underlying mathematical nature of quantum programs, arbitrary Quil can be compiled into a much smaller set of quantum instructions, referred to as native Quil. However, when Quil programs that contain values determined at runtime (as opposed to compile time), the process can be complicated. In some implementations, parameters may be propagated for single-qubit gates by leveraging Euler decomposition or other techniques. For more information on Euler decomposition, see, for example, the 2006 publication entitled "Quantum Gate Decomposition Algorithms" by Alexander Slepoy; or the 2002 publication entitled "Fast, Arbitrary BRDF Shading for Low-Frequency Lighting Using Spherical Harmonics," by Jan Kautz, et al.

Once the native Quil is generated, the second part of parametric compilation can be performed. In some implementations, for every native Quil instruction, the quantum compiler knows the corresponding calibration information to fetch and instrument instructions to perform. Therefore, native Quil can be compiled into a collection of parametric binaries, which have the values for their parameters set at runtime.

FIG. 6 shows an example binary compilation process 600. The binary compilation process 600 can be run on a classical computer system (e.g., on the servers 108 or controllers 106A, 106B shown in FIG. 1). The example binary compilation process 600 in FIG. 6 is described with respect to an example quantum program implementation of a MAXCUT quantum approximate optimization algorithm (QAOA), which is a hybrid classical/quantum program that can take advantage of a fast feedback between the QPU and classical computing resources to quickly search a parameter space. To run MAXCUT QAOA on a QPU, a user device may establish a secured connection (e.g., via SSH) to a QMI and book time on the QPU. For example, a user at the user device may initiate these actions through command line interface (CLI) or a graphical user interface (GUI). The QMI may be engaged with the QPU, for example, by migrating the QMI to an on-premises server in close proximity to the QPU, and connecting the QMI to the engine associated with the QPU (e.g., by closing one or more switchable links on the on-premises server, the engine or a communication channel between them). In some cases, when the QMI is QPU-engaged, binary compilation may be performed as a step in the process of running hybrid classical/quantum programs. In some implementations, the binary compilation process occurs one time for each scheduled run of a hybrid classical/quantum program. For example, for two qubit MAXCUT QAOA, a single round of these steps may be sufficient in some cases.

In the example binary compilation process 600 in FIG. 6, an arbitrary Quil program 610 includes the raw MAXCUT program instructions written in arbitrary Quil. The arbitrary Quil program 610 specifies certain quantum logic gates like a Hadamard gate (H) and a controlled-NOT (CNOT) gate, which may not be directly implementable on the QPU, but nonetheless are valid Quil quantum logic gates. The arbitrary Quil program 610 may be compiled to native Quil program 620, which is specific to the quantum logic operations that can be executed on the QPU. The native Quil program 620 may then be compiled to an updatable (partial) binary program 630. The example updatable binary program 630 shown in FIG. 6 is an instrument binary that includes an instruction memory section and a data memory section; the instruction section references the data memory section, and the data memory section has not been completed. The data memory section can be completed or otherwise updated (e.g., "patched") from run to run in order to rapidly iterate over a parameter space. The updatable binary program 630 is an example of a parametric/patchable binary.

FIG. 7 is a diagram of an example fast hybrid execution process 700. As shown in FIG. 7, the execution process 700 begins with an updatable binary program 710, which is the updatable binary program 630 from FIG. 6. In the example MAXCUT program represented in FIG. 6, the formal parameters of the single-qubit RZ gates (quantum logic gates that perform a rotation about the Z-axis of the Bloch sphere) are the only parameters that need to be modified from run to run. Thus, the binaries that represent the MAXCUT program can be compiled once and patched with the parameter values between runs. In particular, the updatable binary program 710 can be updated with these parameter values to produce the updated binary program 720. In the example shown, the parameter values are appended to the end of the updatable binary program 710 to form the updated binary program 720. An updatable binary program may be updated in another manner, for example, inserting parameter values or other information in another section of the program. As shown in FIG. 7, the updated binary program 720 is executed on a QPU, and the execution produces output data represented by the measurement results 730. For instance, the measurement results may include a bitstring representing measurements of individual qubits in the QPU. One or more of such measurement results may be obtained before the parameter values of the quantum program are updated, for example, by the QMI or otherwise. In some cases, the beta and gamma parameters of the MAX-CUT program shown in FIG. 6 determine the amount of rotations on qubit phases. When a QMI is QPU-engaged (e.g., as shown in FIG. 4), it may be located in close proximity (low-latency position) relative to the QPU, and thus the QMI can quickly determine the parameters for the following run based on the quantum measurement results 730 of the previous run.

In some implementations of the example hybrid execution process 700, the updatable binary program 710 can be loaded onto a shared memory in a rack (e.g., the rack 250 in FIG. 2, the rack 440 in FIG. 4, etc.) of the quantum computing system, and updated binary program 720 can be produced by directly writing parameter values to the shared memory in the rack. In some implementations of the example hybrid execution process 700, the updatable binary program 710 can be combined with the parameter values on the execution engine (e.g., the engine 240 in FIG. 2, the engine 426 in FIG. 4, etc.) and stored locally to form the updated binary program 720; then the updated binary program 720 can be loaded onto the rack (e.g., the rack 250 in FIG. 2, the rack 440 in FIG. 4, etc.) of the quantum computer system. In either case, the use of low-latency communication channels (e.g., between the QMI, the engine, the rack, the QPU, etc.) can reduce the time duration between (1) the time when the QMI issues an instruction to generate the updated binary program 720, and (2) the time when the updated binary program 720 can affect the course of the hybrid classical/quantum program execution; for instance, the time duration may be reduced to sub-coherence time (e.g., less than the coherence time of qubits defined in the QPU).

Figure 8:
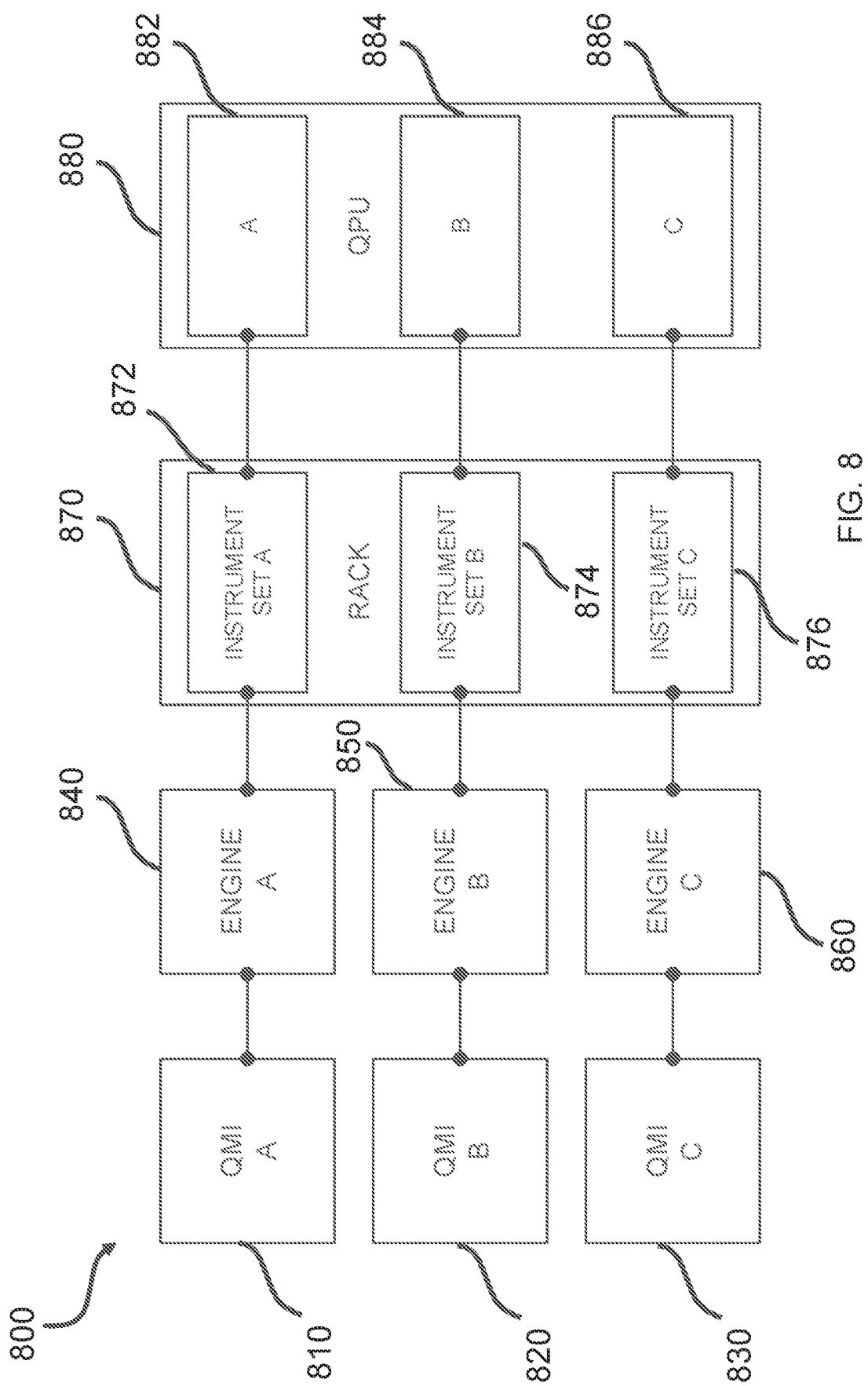
FIG. 8 is a schematic representation of an example multitenancy computing system.

FIG. 8 is a schematic representation of an example multitenancy computing system 800. In some cases, a multitenancy system refers to a computing system in which several QMIs (e.g., QMIs associated with distinct user accounts) are all QPU-engaged and have access to the same QPU 880 in parallel. In some cases, such access to a QPU can be realized by creating a configuration of qubit and qubit-qubit links, for example, within a chip in the QPU. In some implementations, QPU multitenancy can be provided by a computing system in which several users can have access to the same hardware resource (e.g., the same chip) in a single QPU (e.g., simultaneously or otherwise). In some cases, a computing system can be modified to provide QPU multitenancy capabilities.

In the example multitenancy computing system 800 shown in FIG. 8, three QMIs 810, 820, and 830 are shown as simultaneously QPU-engaged. The three QMIs may be associated with distinct users (e.g., three distinct user accounts), and may be remotely accessed by three distinct user devices. Generally, an arbitrary number of QMIs may be simultaneously QPU-engaged, and each engagement can be independent of the others. For example, each QMI may QPU-engaged for a different amount of time or a different purpose. In some instances, each QMI (810, 820, and 830) can be stored on (and may operate on) a respective host server, or all three QMIs can be stored on (and may operate on) a single host server located close to the QPU 880. In some instances, the QMIs 810, 820, and 830 compile quantum programs on engines 840, 850, and 860, respectively. The compiled binary programs are then sent to three different instrument sets (872, 874, and 876) in rack 870, corresponding to the three engines 840, 850, and 860, respectively. The compiled programs are then run on three independent configurations of qubits and qubit-qubit links (882, 884, 886) on the QPU 880, which is effectuated by instrument sets 872, 874, and 876, respectively. The partition of the rack 870 may be determined by the number of independent configurations of qubit and qubit-qubit links available on the chip in the QPU 880. In some cases, a single quantum program initiated via a single QMI can be run across multiple QPUs. The parallel implementation may be achieved using a scheduler (e.g., as described below or otherwise) that partitions a quantum program into parallelizable parts. The example multitenancy computing system 800 may include additional or different features, and the components of the system 800 may operate as described with respect to FIG. 8 or in another manner.

In some implementations, the physical connections between a server that operates the QMIs 810, 820, 830 and the engines 840, 850, 860, between the engines 840, 850, 860 and the rack 870, and between the rack 870 and the QPU 880 form a plurality of low-latency communication pathways between the QMIs 810, 820, 830 and the QPU 880. The physical connections may be provided, for example, by the types of hardware described with respect to FIG. 2. Such equipment may operate in the system 800 as a communication channel that provides low-latency communication pathways from QMIs in a classical computing system to respective QPU instances in a quantum computing system.

Figure 9:
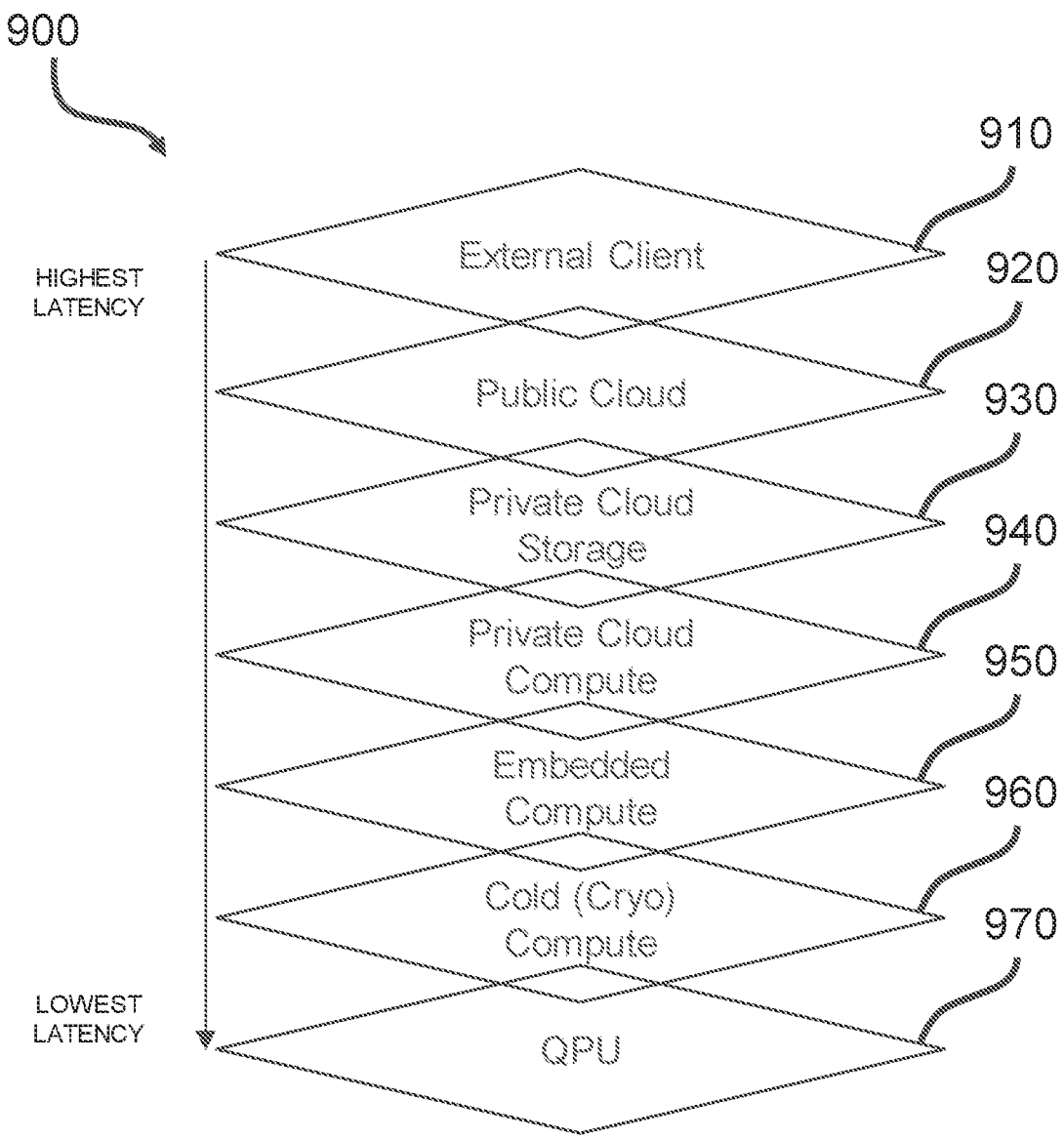
FIG. 9 is a representation of differing levels of latency in some example computing systems.

FIG. 9 is a representation of differing levels of latency in some example computing systems. For example, one or more of the latency levels shown in FIG. 9 may be provided in a computing environment that includes a high-performance computing system. In some contexts, the levels of latency may be defined with reference to the time required to run an iterative hybrid classical/quantum program on a QPU, where updates to the program are performed between iterations. In these and other contexts, the latency may be primarily determined by the time for data to be transmitted between the QPU and a classical computer system where the updates are determined.

For purposes of illustration, the levels of latency may be described with reference to the example computing environment 100 shown in FIG. 1. In the example shown in FIG. 9, the lowest latency level shown is for an external client such as the user's environment on their computer (e.g., the remote user devices 110B, 110C in FIG. 1); next is a third-party resource such as a public cloud (e.g., the type provided by Amazon Web Services or Microsoft Azure Cloud Services, which may be accessible to the computing system 101 via the wide area network 115 in FIG. 1); next is private cloud storage, which is an on-premises classical resource that may be optimized for storage (e.g., a storage device included in the other resources 107 in FIG. 1); next is private cloud compute, which is an on-premises classical resource optimized for low-latency hybrid classical/quantum computing, having a direct low-latency connection to the instruments and/or embedded computing resources that control the QPU (e.g., an example configuration of the servers 108 in FIG. 1); next is embedded compute, which are classical computing resources on the instrument rack that controls the QPU (e.g., an example configuration of the controllers 106A, 106B in FIG. 1); next is cold compute, where the classical computing resources are in the cryostat which contains the quantum processor chip (applicable for superconducting circuit QPUs) (e.g., an example environment that may be provided by the control systems 105A, 105B in FIG. 1); last is the QPU itself, where there are classical computing resources at the QPU chip level (e.g., an example configuration of the QPUs 102A, 102B in FIG. 1). Other levels of latency may be provided in a computer environment in some cases.

Figure 10:
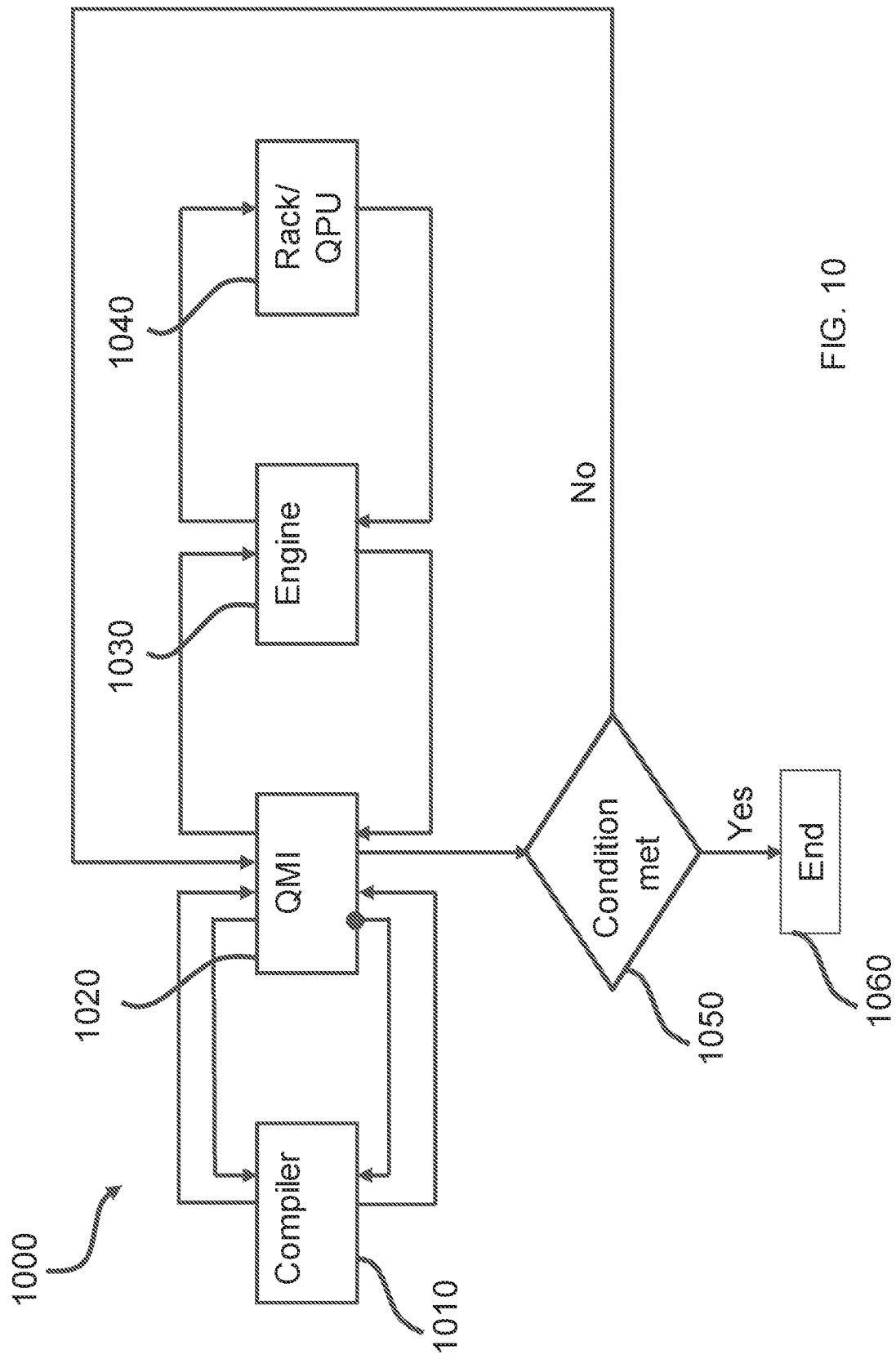
FIG. 10 is a diagram of an example hybrid fast quantum program execution process.

FIG. 10 is a diagram of an example hybrid classical/quantum program execution process 1000. In some cases, the example process 1000 shown in FIG. 10 may be executed according to, in connection with, or further to the example process 500 shown in FIG. 5. In some implementations, the example process 1000 may be implemented in the example computing environment 100 of FIG. 1, the example computing system 200 of FIG. 2 or in another type of computing system.

FIG. 10 shows example operations performed by a compiler 1010, a QMI 1020, an engine 1030 and a rack/QPU 1040. The compiler 1010 and the QMI 1020 may be implemented in a classical computer system for instance, as the compiler 221 and the QMI 222 shown in FIG. 2. In some cases, the QMI 1020 and the compiler 1010 operate on the same server (e.g., a host server), or they may operate on separate servers. The engine 1030 and the rack/QPU 1040 may be implemented in a quantum computer system, for instance, as the engine 240, the rack 250 and the QPU 260 in FIG. 2.

In the example process 1000 shown in FIG. 10, the QMI 1020 accesses a source code quantum program, e.g., in the form of arbitrary Quil program. The source code quantum program is then sent to the compiler 1010 to be compiled to a native Quil program, which may be sent to the QMI 1020. The compiler 1010 may further compile the native Quil program to an updatable (partial) binary program, which may be sent to the QMI 1020. For example, after the native Quil program has been generated, the second part of the parametric compilation process can be performed. For every native Quil instruction, the compiler 1010 knows the corresponding calibration information to fetch and instrument instructions to specify. Therefore, native Quil can be compiled into a collection of parametric binaries, which may have the values for their parameters set at runtime. The updatable binary programs (and in some cases, parameter values) are then sent to the engine 1030, which produces updated (executable) binary programs (e.g., patched binaries) and sends the results to the rack/QPU 1040 for execution. In some implementations, the QMI 1020 has a low-latency communication link to the rack/QPU 1040. The rack/QPU 1040 returns the measurement data (e.g., raw signal data or otherwise) to the engine 1030, which classifies the measurement data into binary measurement results. The output of the engine 1030 is fed back to a classical optimizer at the QMI 1020. A decision engine 1050 (e.g., in a classical computer system) determines whether the condition for optimization of the objective function for the computation is met; if so, the output of the computation is generated and the process 1000 terminates at 1060. If the optimization condition is not met, then the process 1000 goes back to the QMI 1020 and a new set of parameters is chosen and the process 1000 is repeated.

In some implementations of a computing system, a scheduler coordinates utilization of quantum resources (e.g., lattices, etc.), for example, in accord with a system use schedule. This coordination can include acting on a hybrid classical/quantum computer system according to the schedule, managing the schedule, managing quantum resources, enforcing users' compliance with the schedule, sending notifications to user devices, data collection (e.g., tracking use of services by a user, for billing purposes or otherwise), or a combination of these and other types of tasks. The scheduler can provide access control information (ACI) to the system, for instance, to enable engagement of QMIs and to permit utilization of quantum resources for a specific calendared time (e.g., a reservation). The access control information may include for example, an instruction set architecture (ISA), an end time of reservation, identification of quantum resource to be accessed, or a combination of these and other types of information.

In some example schedulers, a calendar may be implemented as a database representation of events ("reservations"), where a reservation is a block of time in the calendar, between a start time and an end time. In some implementations, a reservation may have additional information assigned to it, such as a user identification, a QMI identification, a classical resource claiming the reservation, the device, lattice or other quantum resource (e.g., a QPU or quantum simulator) the reservation is claiming for its period of time (and implicitly any classical control resources required by that quantum resource), or a combination of these and others. In some cases, a scheduler may represent reservations in terms of epochs, which is a minimum indivisible unit of time in the calendar. In some implementations, the epoch duration divides one hour (e.g., one hour may be an integer multiple of the epoch duration), and all calendar events have a duration of some integer multiple of the epoch duration. In some implementations, calendar event start times may be restricted to epoch intervals starting on the hour, quarter hour, etc., for example. A scheduler process may occur periodically at a scheduler process interval. In some implementations, the scheduler process interval divides the epoch (such that one epoch is an integer multiple of the scheduler process interval, for example).

Figure 11:
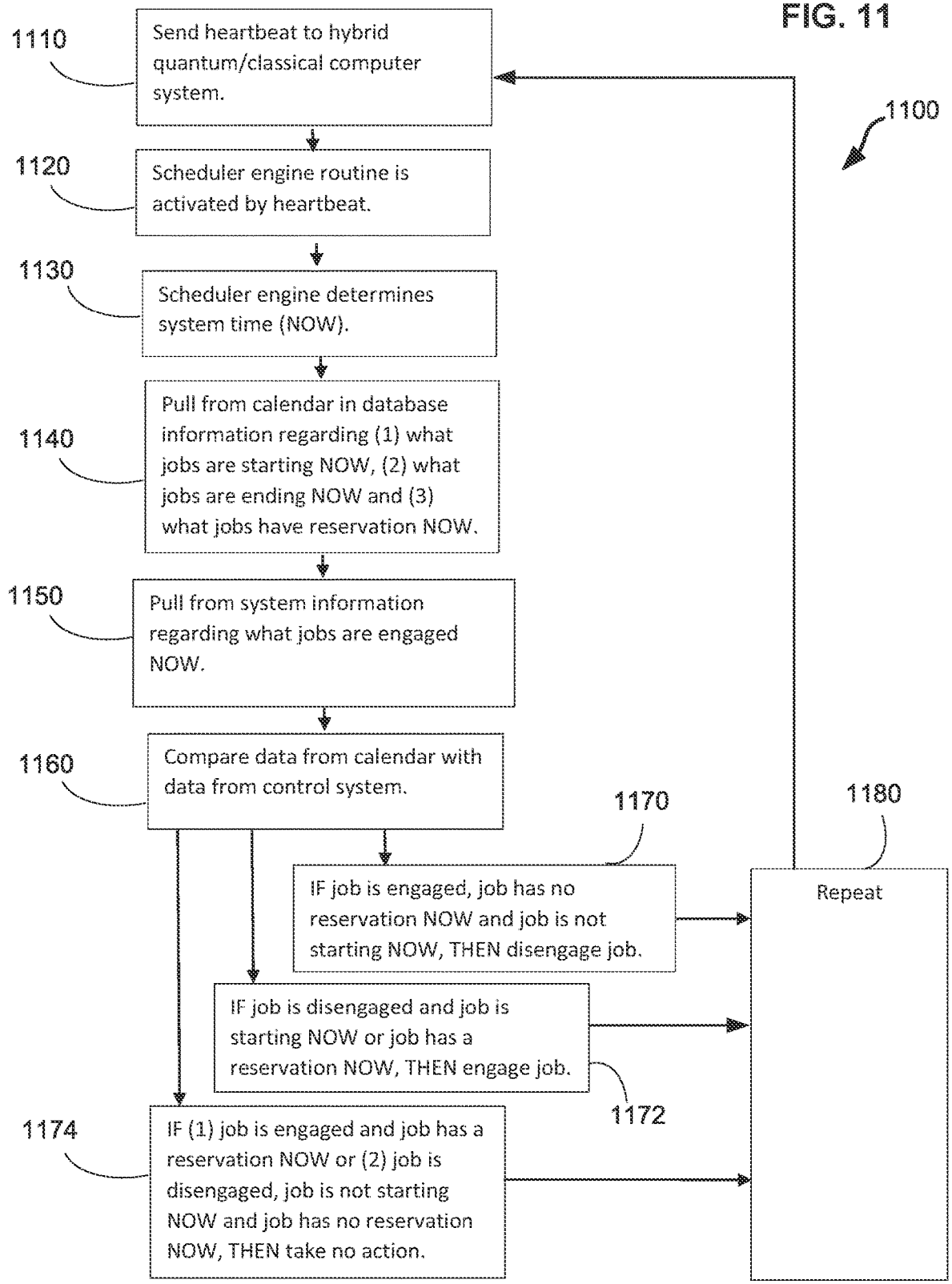
FIG. 11 is a flow chart showing an example process run by a scheduler.

FIG. 11 shows an example process 1100 that may be run by an example scheduler. For example, the process 1100 may be executed to change the state of, or act upon, a hybrid classical/quantum computer system (e.g., to ensure compliance with a calendar), according to a schedule. At 1110, a heartbeat is sent to the hybrid classical/quantum computer system; the heartbeat may be generated by a chronometer. At 1120, the scheduler engine routine is activated by the heartbeat; the scheduler engine and the chronometer can be situated on the same server or on distinct servers or can be components of one or more processor, for example. At 1130, the scheduler engine determines the system time (NOW) of the hybrid classical/quantum computer system. At 1140, the scheduler engine pulls calendar data from the calendar database. The calendar data includes information regarding (1) which jobs are starting NOW, (2) which jobs are ending now, and (3) which jobs have reservations NOW. Here, a job includes an execution of a quantum program on the QPU. The calendar database can be situated on a server, one or more processors, or a memory device, for example. At 1150, the scheduler engine pulls control system data from the control engine, control rack, QMI and/or network switch. The control system data includes information regarding which jobs are engaged NOW. At 1160, the scheduler engine compares the data pulled from the calendar with the information pulled regarding which jobs are actually engaged and may perform an appropriate action based on the comparison. In the example shown in FIG. 11, the scheduler engine performs one or more of the operations represented at 1170, 1172 and 1174 in FIG. 11 based on the comparison at 1160. At 1170, if a job is engaged and the job has no reservation NOW, then disengage the job. At 1172, if a job is disengaged and the job has a reservation NOW, then engage the job. At 1174, (1) if a job is engaged and the job has a reservation NOW, then take no action, and (2) if a job is disengaged, the job is not starting NOW and the job has no reservation NOW, then take no action. At 1180, the process 1100 is repeated, starting at 1110 again. The process 1100 may be run at any time, although in some implementations heartbeats can have a frequency which is at minimum the inverse of the minimum booking time (epoch) on the system, or the scheduler process interval.

In some implementations, a scheduler may also handle booking of reservations by a user account. For example, a user device may submit a request with the desired number of epochs for a reservation (total time), a desired start time and a desired lattice. The scheduler may examine the calendar for gaps of a sufficient number of epochs on or after the requested start time, and may either make a reservation or provide options to the user, followed by making a reservation when the user makes a selection. A reservation in the calendar will typically include a start time, an end time, a lattice identification, and a user identification. In some implementations, the scheduler may send resource requests to a resource availability/allocation engine for identification of resource offerings and communication of the same to the scheduler. The resource availability/allocation engine may utilize an algorithm or application of select criteria in order to identify resource offerings for a particular user. A wide range of algorithms and criteria can be chosen for use by the resource availability/allocation engine including first come first served allocation of resources, allocation of resources optimized to make maximum use of a QPU, etc.

FIG. 12 is a quantum logic circuit diagram 1200 showing example qubit reset operations. The quantum logic circuit diagram 1200 shows a passive reset process applied to a first qubit 1202 and an active reset process applied to a second qubit 1204. In the example quantum logic circuit diagram 1200, both qubits 1202 and 1204 begin in the ground state, represented as the computational basis state |0⟩ in FIG. 12.

The first qubit 1202 evolves under a unitary operation 1216, which manipulates the coherent state of the first qubit 1202, and the first qubit 1202 is then measured by a measurement operation 1216. The measurement operation 1216 collapses the first qubit 1202 to one of its computational basis states, either |0⟩ or |1⟩, and produces a corresponding binary measurement result. To reset the first qubit 1202 to the ground state |0⟩, an idle period 1220 is provided in the quantum logic circuit. The idle period 1220 represents a passive reset process, in which active control is not applied to the first qubit 1202. During the idle period 1220, the first qubit 1202 relaxes (e.g., under a T1 decoherence process) to its ground state |0⟩. As such, the idle period 1220 is long enough (e.g., equal to or longer than, or in some instances some integer multiple of, the characteristic T1 coherence time) to ensure the ground state |0⟩ is achieved.

The second qubit 1204 evolves under a unitary operation 1218, which manipulates the coherent state of the qubit 1204, and the second qubit 1204 is then measured by a measurement operation 1218. The measurement operation 1218 collapses the second qubit 1204 to one of its computational basis states, either |0⟩ or |1⟩, and produces a corresponding binary measurement result. To reset the second qubit 1204 to the ground state |0⟩, a conditional NOT gate 1222 is applied based on the measurement result obtained by the measurement operation 1218. In the example shown in FIG. 12, the conditional NOT gate 1222 either: does nothing if the qubit is already in the ground state |0⟩ according to the measurement operation 1218; or coherently rotates the qubit by 180 degrees (about the X axis of the Bloch sphere) if the qubit is in the excited state |1⟩ according to the measurement operation 1218. The conditional NOT gate 1222 represents an active reset process, in which the second qubit 1204 is flipped (e.g., under a coherent rotation) to its ground state |0⟩ only if the measurement operation 1218 indicates the excited state |1⟩. As such, the active reset process may utilize coherent control of the second qubit 1204 to reset the state of the qubit to the ground state |0⟩.

As shown in FIG. 12, the active reset process applied to the second qubit 1204 can be much faster than the passive reset process applied to the first qubit 1202. As such, active reset may be applied to all qubits in a QPU, for example, to reduce the amount of time between iterations of a program or to otherwise improve QPU utilization. In some implementations, the amount of time that is required to apply the active reset process to the second qubit 1204 is less than the coherence time of the second qubit 1204.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a computer system includes a low-latency communication link between a classical computer and a quantum computing resource.

In a first example, a quantum machine image operates on a classical computer system. The quantum machine image includes a virtual representation of an execution environment for quantum programs (including pure quantum programs and hybrid classical/quantum programs). The quantum machine image is engaged with a quantum processing unit of a quantum computing system. A quantum program is communicated over a low-latency communication pathway from the classical computer system to the quantum computer system. The quantum program is then executed at the quantum computer system.

In a second example, a computer system includes a quantum computer system, a classical computer system and a communication channel that provides a low-latency communication pathway from the classical computer system to the quantum computer system. The classical computer system includes one or more classical processing units and computer-readable media that store instructions. The instructions, when executed by the one or more classical processing units, may perform one or more of the operations of the classical computer system in the first example.

Implementations of the first or second example may include one or more of the following features. A quantum virtual machine may operate on the classical computer system. The quantum virtual machine operating on the classical computer system may be accessible by the quantum machine image operating on the classical computer system. The quantum virtual machine and the quantum machine image may both operate on the same server of the classical computer system. The quantum virtual machine may operate on a first server of the classical computer system, and the quantum machine image may operate on a second server of the classical computer system. The quantum machine image may include a software development kit comprising tools for developing quantum programs.

Implementations of the first or second example may include one or more of the following features. A hybrid classical/quantum program may be executed by operation of the quantum machine image. Executing the hybrid classical/quantum program may include using one or more classical processing units of the classical computer system to execute classical computing operations in the hybrid classical/quantum program, and using the quantum processing unit as a co-processor to execute quantum computing operations in the hybrid classical/quantum program. Executing the hybrid classical/quantum program may include executing an iterative process. On each iteration, the quantum machine image, operating on the classical computer system, may: receive, over the low-latency communication pathway, quantum processor output data from a first set of quantum computing operations executed by the quantum processing unit; generate classical processor output data based on the quantum processor output data; specify a second set of quantum computing operations based on the classical processor output data; and send, over the low-latency communication pathway, the second set of quantum computing operations to the quantum computer system. The iterative process may include an optimization loop, and each iteration may include determining whether an optimization condition has been met.

Implementations of the first or second example may include one or more of the following features. Engaging the quantum machine image with the quantum processing unit may permit the quantum machine image to utilize the quantum processing unit for a specified period of time. A compiler (and in some cases, an execution engine) may be configured to target an instruction set architecture, an instrument rack, calibration specifications of the quantum processing unit, or a combination of them. Engaging the quantum machine image with the quantum processing unit may provide the quantum machine image access to the quantum processing unit through the low-latency communication pathway. Engaging the quantum machine image with the quantum processing unit may include moving the quantum machine image from a storage server to the classical computer system. Engaging the quantum machine image with the quantum processing unit comprises changing a state of a switchable link. The switchable link may be a virtual switch implemented in software.

Implementations of the first or second example may include one or more of the following features. The communication channel that provides the low-latency communication pathway may include a switchable link that has open and closed states. The communication channel that provides the low-latency communication pathway may include a high speed Ethernet cable and a switch. The quantum computer system and the classical computer system may include respective communication interfaces, and the communication channel that provides the low-latency communication pathway may include the communication interfaces of the classical and quantum computer systems and a local network that provides communication between the respective communication interfaces.

Implementations of the first or second example may include one or more of the following features. The classical computer system may be co-located on premises with the quantum computer system, and the communication channel may provide faster communication than a remote connection between the classical computer system and a remote computer system (e.g., a remote connection to a user device over a wide area connection). The communication channel may be a local network that operates in a secure computing environment (e.g., behind a firewall, etc.).

Implementations of the first or second example may include one or more of the following features. The quantum machine image may be allocated to a user account. A plurality of quantum machine images may be allocated to respective user accounts. The quantum program may be compiled (e.g., to another format such as, for example, a binary program) by a compiler operating on the classical computer system. The compiler and the quantum machine image may both operate on the same server of the classical computer system. The compiler may operate on a first server of the classical computer system, and the quantum machine image may operate on a second server of the classical computer system. Compiling the quantum program may include generating a binary program based on a quantum instruction language program (e.g., arbitrary Quil). Compiling the quantum program may include generating a binary program (e.g., a partial binary program) that is formatted to be updated with parameters set at runtime. The classical computer system may (e.g., at runtime) obtain parameter values for an execution of the binary program and generate an updated version of the binary program that includes the parameter values. A control system of the quantum computer system may (e.g., at runtime) obtain parameter values for an execution of the binary program and generate an updated version of the binary program that includes the parameter values. The control system may include an instrument rack that operates the quantum processing unit according to the updated binary program.

Implementations of the first or second example may include one or more of the following features. An active reset process may be performed by the quantum computing system to initialize a quantum state of the quantum processing unit (e.g., to reset qubits within the quantum processing unit to their ground state or another computational basis state). The active reset process may include a feedback process in which: qubits are measured to obtain measurement outcomes for the respective qubits; measured qubits that are not in the ground state according to the measurement outcomes are flipped; measured qubits that are in the ground state according to the measurement outcomes are not flipped. The feedback process may be applied iteratively.

Implementations of the first or second example may include one or more of the following features. The quantum machine image may operate on the classical computer system in response to instructions from a user device located remotely from the classical computer system. The instructions may be received at the classical computer system over a communication channel that provides a high-latency communication path (e.g., a wide area network) between the classical computer system and the user device. The high-latency communication path may include the Internet. The classical computer system may receive the instructions from the user device over a secure shell (SSH) connection. The classical computer system may receive the instructions from the user device over a secure copy protocol (SCP) connection.

Implementations of the first or second example may include one or more of the following features. The communication channel may provide a plurality of low-latency communication pathways from the classical computer system to the quantum computer system. A plurality of distinct quantum machine images may operate on the classical computer system. Each respective quantum machine image may be engaged with the quantum processing unit. Quantum programs may be communicated over the respective low-latency communication pathways from the classical computer system to the quantum computer system. The quantum programs may be executed at the quantum computer system.

In a third example, a secured connection is established between a host server system and a remote user device. Programs are generated by a quantum machine image on the host server system. The programs are generated in response to instructions received from the remote user device over the secured connection. The programs are sent over a low-latency communication pathway from the host system to a control system of a quantum computer system. The programs are executed by operation of the quantum computer system.

In a fourth example, a cloud-based computer system includes a quantum processor unit, a control system configured to operate the quantum processor unit; a host server; and a communication channel that provides a low-latency communication pathway from a host server system to the control system. The host server includes one or more classical processing units and computer-readable media that store instructions. The instructions, when executed by the one or more classical processing units, may perform one or more of the operations of the third example.

Implementations of the third or fourth example may include one or more of the following features. Establishing a secured connection may include establishing an SSH connection over the Internet. Establishing a secured connection may include establishing an SCP connection over the Internet. The control system may include an execution engine and an instrument rack. The programs generated by the quantum machine image may be converted to binary programs. Sending the programs over the low-latency communication pathway may include sending the binary programs over the low-latency communication pathway. The low-latency communication pathway may provide for the amount of time it takes between the issue of an instruction to change classical memory to a time when this change can affect the course of program execution to be sub-coherence-time.

Implementations of the third or fourth example may include one or more of the following features. The host server and the remote user device may operate on different premises, for example, more than 1 km apart. The host server and the quantum processor unit may operate on the same premises, for example, less than 1 km or less than 0.5 km apart.

Implementations of the third or fourth example may include one or more of the following features. The programs generated by the quantum machine image can be hybrid classical/quantum programs that include classical computing operations and quantum computing operations. The quantum machine image may execute the hybrid classical/quantum program by using one or more classical processing units of the host server to execute the classical computing operations, and using the quantum processing unit to execute the quantum computing operations.

In a fifth example, a computing system includes a server including a quantum machine image (QMI) and a quantum processing unit (QPU), in which the QMI is connected to the QPU by a low-latency link. The QMI can be a virtual machine image comprising a preconfigured user programming environment.

Implementations of the fifth example may include one or more of the following features. The QMI may include a software development kit. The low-latency link may provide for the amount of time it takes between the issue of an instruction to change classical memory to a time when this change can affect the course of program execution to be sub-coherence-time.

Implementations of the fifth example may include one or more of the following features. The computing system may include a compiler. The compiler may be included in the QMI. The compiler may be located on the server and be linked to the QMI. The compiler may be located on a second server and be linked to the QMI.

Implementations of the fifth example may include one or more of the following features. The computing system may include a quantum virtual machine (QVM). The QVM may be located on the server accessible to the QMI. The QVM may be a remote QVM that is accessible to the QMI.

Implementations of the fifth example may include one or more of the following features. The low-latency link can be a switchable link having open or closed positions. The low-latency link may include a high speed ethernet cable. The low-latency link may include elements located on the server.

Implementations of the fifth example may include one or more of the following features. The computing system may include an engine and a control system. The computing system may include an orchestrator and a database. The computing system may include a remote user interface connected to the QMI (e.g., connected over the Internet).

In another example, a computing system includes a server and a quantum processing unit (QPU). The server includes multiple quantum machine images (QMIs), wherein each of the QMIs includes a preconfigured user programming environment. Each of the plurality of QMIs is connectable to the QPU by a separate one of a corresponding plurality of low-latency links. The plurality of low-latency links are switchable links having open and closed positions.

In a sixth example, a virtual machine image (VMI) includes a preconfigured user programming environment for hybrid classical/quantum computing, and the VMI is configured to: operate on a classical processing unit, partitioned from a base operating system, and allocated classical computing resources including a processor, random access memory and space on a permanent memory; have a low-latency link to a quantum processing unit for executing a program on a quantum computer; and have access to a compiler.

Implementations of the sixth example may include one or more of the following features. The VMI may include a quantum software development kit. The VMI may be further configured to have access to a graphics processing unit or FPGA. The VMI may be further configured to have access to a quantum virtual machine. The VMI may be further configured to have access to the internet using SSH/SCP protocols. The preconfigured user programming environment may include PYQUIL®. The VMI may be further configured to have access to an HPC cluster for resource intensive data analysis.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A computer system comprising:
a quantum computer system comprising a quantum processing unit, the quantum processing unit comprising a qubit with a coherence time;
a classical computer system; and
a communication channel that provides a low-latency communication pathway from the classical computer system to the quantum computer system,
wherein the classical computer system comprises
one or more classical processing units; and
computer-readable media storing instructions that, when executed by the one or more classical processing units:
operate a quantum machine image on the classical computer system, the quantum machine image comprising a virtualized execution environment for quantum programs;
engage the quantum machine image with the quantum processing unit;
generate a binary program that is formatted to be updated with parameter values set at runtime;
communicate the binary program over the communication pathway from the classical computer system to the quantum computer system for execution by the quantum computer system; and
update, within a time period less than the coherence time, the parameter values during the execution of the binary program.

2. The computer system of claim 1, wherein the quantum machine image is configured to execute a hybrid classical/quantum program, and executing the hybrid classical/quantum program comprises the quantum machine image:
using the one or more classical processing units to execute classical computing operations in the hybrid classical/quantum program; and
using the quantum processing unit as a co-processor to execute quantum computing operations in the hybrid classical/quantum program.

3. The computer system of claim 2, wherein executing the hybrid classical/quantum program comprises the quantum machine image executing an iterative process comprising, on each iteration:
receiving, over the low-latency communication pathway, quantum processor output data from a first set of quantum computing operations executed by the quantum processing unit;
using the one or more classical processing units to generate classical processor output data based on the quantum processor output data;
specifying a second set of quantum computing operations based on the classical processor output data; and
sending, over the low-latency communication pathway, the second set of quantum computing operations to the quantum computer system.

4. The computer system of claim 3, wherein the iterative process comprises an optimization loop, and each iteration comprises determining whether an optimization condition has been met.

5. The computer system of claim 1, wherein the computer-readable media of the classical computer system store instructions that, when executed by the one or more classical processing units, configures a compiler and an execution engine to target an instruction set architecture, an instrument rack and calibration specifications of the quantum processing unit.

6. The computer system of claim 1, wherein engaging the quantum machine image with the quantum processing unit comprises moving the quantum machine image from a storage server to the classical computer system.

7. The computer system of claim 1, wherein the classical computer system is co-located on premises with the quantum computer system, and the communication channel provides faster communication than a connection between the classical computer system and a remote computer system.

8. The computer system of claim 1, wherein the computer-readable media of the classical computer system store instructions that, when executed by the one or more classical processors, operate a compiler on the classical computer system.

9. The computer system of claim 1, wherein the computer-readable media of the classical computer system store instructions that, when executed by the one or more classical processors:
obtain parameter values for an execution of the binary program; and
generate an updated version of the binary program comprising the parameter values.

10. The computer system of claim 1, wherein the quantum computer system comprises a control system comprising:
one or more classical processors; and
computer-readable media storing instructions that, when executed by the one or more classical processors of the quantum computer system:
obtain parameter values for an execution of the binary program; and
generate an updated version of the binary program comprising the parameter values.

11. The computer system of claim 1, wherein the quantum computer system comprises a control system configured to operate the quantum processing unit based on instructions delivered to the quantum computer system from the classical computer system through the low-latency communication pathway.

12. The computer system of claim 11, wherein the control system is configured to perform an active reset process to initialize a quantum state of the quantum processing unit.

13. The computer system of claim 12, wherein the active reset process comprises:
obtaining measurement outcomes for respective qubits of the quantum processing unit; and
flipping only the subset of the qubits that are not in the ground state according to the measurement outcomes.

14. The computer system of claim 1, comprising a user device located remotely from the classical computer system, wherein the quantum machine image is configured to operate on the classical computer system in response to instructions from the user device.

15. A computing method comprising:
operating a quantum machine image on a classical computer system, the quantum machine image comprising a virtualized execution environment for quantum programs;
engaging the quantum machine image with a quantum processing unit of a quantum computer system, wherein the quantum processing unit comprises a qubit with a coherence time;
generating, by the classical computer system, a binary program that is formatted to be updated with parameter values set at runtime;
communicating the binary program over a low-latency communication pathway from the classical computer system to the quantum computer system;
executing the binary program at the quantum computer system; and
updating, by the classical computer system using the low-latency communication pathway, within a time period less than the coherence time, the parameter values during the execution of the binary program.

16. The method of claim 15, comprising, by operation of a compiler on the classical computer system, generating the binary program.

17. The method of claim 16, wherein the binary program is generated based on a quantum instruction language program.

18. The method of claim 15, comprising, by operation of the classical computer system:
obtaining parameter values for an execution of the binary program; and
generating an updated version of the binary program comprising the parameter values.

19. The method of claim 18, wherein the quantum machine image issues an instruction to generate the updated version of the binary program, the updated version of the binary program is sent to the quantum computer system over the low-latency communication pathway, and the time duration between (i) the instruction being issued by the quantum machine image and (ii) the updated version of the binary program affecting program execution by the quantum computer system is less than the coherence time.

20. The method of claim 15, comprising performing an active reset process to initialize a quantum state of the quantum processing unit.

21. The method of claim 20, wherein performing the active reset process comprises:
obtaining measurement outcomes for respective qubits of the quantum processing unit; and
flipping only the subset of the qubits that are not in the ground state according to the measurement outcomes.

* * * * *